US011106967B2

(12) United States Patent
Shankar et al.

(10) Patent No.: US 11,106,967 B2
(45) Date of Patent: Aug. 31, 2021

(54) UPDATE OF LOCAL FEATURES MODEL BASED ON CORRECTION TO ROBOT ACTION

(71) Applicants: Krishna Shankar, Los Altos, CA (US); Nicolas Hudson, San Mateo, CA (US); Alexander Toshev, San Francisco, CA (US)

(72) Inventors: Krishna Shankar, Los Altos, CA (US); Nicolas Hudson, San Mateo, CA (US); Alexander Toshev, San Francisco, CA (US)

(73) Assignee: X DEVELOPMENT LLC, Mountain View, CA (US)

( * ) Notice: Subject to any disclaimer, the term of this patent is extended or adjusted under 35 U.S.C. 154(b) by 1018 days.

(21) Appl. No.: 15/640,936

(22) Filed: Jul. 3, 2017

(65) Prior Publication Data

US 2019/0005374 A1     Jan. 3, 2019

(51) Int. Cl.
| | |
|---|---|
| *G06N 3/04* | (2006.01) |
| *G06N 3/08* | (2006.01) |
| *G06N 3/00* | (2006.01) |
| *G06K 9/62* | (2006.01) |
| *B25J 9/16* | (2006.01) |

(52) U.S. Cl.
CPC .............. *G06N 3/04* (2013.01); *B25J 9/161* (2013.01); *B25J 9/1605* (2013.01); *B25J 9/1671* (2013.01); *G06K 9/6254* (2013.01); *G06N 3/008* (2013.01); *G06N 3/08* (2013.01); *G06N 3/084* (2013.01); *Y10S 901/03* (2013.01)

(58) Field of Classification Search
CPC ........... B25J 9/161; G06N 3/008; G06N 3/04; G06N 3/08; G06N 3/084
See application file for complete search history.

(56) References Cited

U.S. PATENT DOCUMENTS 9,785,866 B2 * 10/2017 Hua ..................... G06N 20/00
2012/0072023 A1 * 3/2012 Ota ..................... B25J 9/1671
700/259

(Continued)

OTHER PUBLICATIONS

Amershi, S. et al. "Power to the people: The role of humans in interactive machine learning." AI Magazine 35, No. 4 (2014): 105-120.

(Continued)

*Primary Examiner* — Benjamin P Geib
(74) *Attorney, Agent, or Firm* — Middleton Reutlinger

(57) ABSTRACT

Methods, apparatus, and computer-readable media for determining and utilizing corrections to robot actions. Some implementations are directed to updating a local features model of a robot in response to determining a human correction of an action performed by the robot. The local features model is used to determine, based on an embedding generated over a corresponding neural network model, one or more features that are most similar to the generated embedding. Updating the local features model in response to a human correction can include updating a feature embedding, of the local features model, that corresponds to the human correction. Adjustment(s) to the features model can immediately improve robot performance without necessitating retraining of the corresponding neural network model.

23 Claims, 10 Drawing Sheets

(56) References Cited

U.S. PATENT DOCUMENTS

| | | | |
|---|---|---|---|
| 2012/0130541 | A1 | 5/2012 | Szalek |
| 2013/0325775 | A1 | 12/2013 | Sinyayskiy et al. |
| 2013/0346348 | A1 | 12/2013 | Buehler et al. |
| 2014/0277718 | A1 | 9/2014 | Izhikevich et al. |
| 2014/0371912 | A1 | 12/2014 | Passot et al. |
| 2015/0336274 | A1 | 11/2015 | Connell, II et al. |
| 2016/0096270 | A1 | 4/2016 | Ibarz Gabardos et al. |
| 2016/0279790 | A1 | 9/2016 | Meier et al. |
| 2018/0114334 | A1* | 4/2018 | Desai .................. G06K 9/66 |
| 2020/0215686 | A1 | 7/2020 | Vijayanarasimhan et al. |

OTHER PUBLICATIONS

Argall, B. et al. "A survey of robot learning from demonstration." Robotics and autonomous systems 57, No. 5 (2009): 469-483.

Bekel, H. et al. "Adaptive computer vision: Online learning for object recognition." In DAGM-Symposium, vol. 3175, pp. 447-4540. 2004.

Branson, S. et al. "Visual recognition with humans in the loop." Computer Vision—ECCV 2010 (2010): 438-451.

Chao, C. et al. "Transparent active learning for robots." In Human-Robot Interaction (HRI), 2010 5th ACM/IEEE International Conference on, pp. 317-324. IEEE, 2010.

Grizou, J. et al. Robot Learning Simultaneously a Task and How to Interpret Human Instructions. Joint IEEE International Conference on Development and Learning an on Epigenetic Robotics (ICDL-EpiRob), Aug. 2013, Osaka, Japan. ; 9 pages.

Matuszek, C. et al. "Learning to parse natural language commands to a robot control system." In Experimental Robotics, pp. 403-415. Springer International Publishing, 2013.

Rouanet, P. et al. The Impact of Human-Robot Interfaces on the Learning of Visual Objects. IEEE Transactions on Robotics, IEEE, 2013, 29 (2), pp. 525-541; 18 pages.

Thomaz, A. et al. "Teachable robots: Understanding human teaching behavior to build more effective robot learners." Artificial Intelligence 172, No. 6-7 (2008): 716-737.

Wang, Z. et al. "Robot grasp detection using multimodal deep convolutional neural networks." Advances in Mechanical Engineering 8.9 (2016): XP055511783, ISSN:1687-8140, DOI: 10.1177/1687814016668077; 12 pages 2016.

Jetley, S. et al., "Prototypical Priors: From Improving Classification to Zero-Shot Learning", XP055511790, Retrieved from the Internet: URL:https://arxiv.org/pdf/1512.01192v1.pdf Dec. 3, 2015.

Tan, S., et al. "Using DragPushing to Refine Centroid Text Classifiers"; Proceedings of the 28th Annual International ACM SIGIR Conference on Research and Development in Information Retrieval; Salvador, Brazil; pp. 653-654, XP058100541, DOI: 10.1145/1076034.1076174 ISBN: 978-1-59593-034-7 Aug. 15, 2005.

Borodin, Y., et al. "Live and Learn from mistakes: A lightweight system for document classification", Information Processing & Management, vol. 49, No. 1, pp. 83-98, XP055511796, GB ISSN: 0306-4573, DOI: 10.1016/j.ipm.2012.02.001 Jan. 1, 2013.

European Patent Office; International Search Report and Written Opinion of PCT Serial No. PCT/US2018/040644; 30 pages; dated Oct. 29, 2018.

Murakami, T., "Interactive Robot Supporting System for Object Acquisition", SICE Annual Conference 2007, pp. 2309-2314; Jan. 1, 2007.

* cited by examiner

UPDATE OF LOCAL FEATURES MODEL BASED ON CORRECTION TO ROBOT ACTION

BACKGROUND

A robot that has been purchased and put into use may be able to perform a variety of actions. However, in some situations the robot may still perform some actions incorrectly and/or be unable to perform some actions. Such occurrences may be due to a variety of factors such as lack of accuracy and/or robustness of model(s) utilized by the robot in performing actions, varied and/or dynamic environments in which the robot operates, etc. Moreover, for many occurrences of incorrect performance of an action, the robot itself may be unable to recognize the incorrect performance. For example, control processes of the robot may deem an action as correctly performed, despite the performance being incorrect in actuality.

SUMMARY

The present disclosure is directed to methods, apparatus, and computer-readable media (transitory and non-transitory) for determining and utilizing human corrections to robot actions. Some of those implementations are directed to updating a features model of a robot in response to determining a human correction of an action performed by the robot. The features model can be a "local" features model, in that it is utilized by only the robot and/or in that it is stored locally at the robot. The features model is used to determine, based on an embedding generated over a corresponding neural network model, one or more features that are most similar to the generated embedding. For example, the features model may include stored mappings between features and corresponding feature embeddings. A feature can be determined to be most similar to the generated embedding based on the feature being mapped, in the features model, to a feature embedding that is most similar to the generated embedding.

In such an example, the robot action can be performed based on the feature, and the human correction can indicate that the feature is incorrect and/or that an additional feature is instead correct (or is also correct). In response to the human correction, the features model can be updated. For example, an additional feature embedding that is mapped to the additional feature can be adjusted (i.e., to make it more similar to the generated embedding) and/or the feature embedding that is mapped to the feature in the model can be adjusted (i.e., to make it less similar to the generated embedding). As another example, if the additional feature is not included in the model, the additional feature can be included and assigned a feature embedding that is based on (e.g., the same as) the generated embedding. The features model can be updated in response to human corrections, and can be updated without requiring retraining of the corresponding neural network model.

As one particular example of implementations disclosed herein, the features model can be a classification model. The classification model can be locally stored on a robot and can map classifications to corresponding classification embeddings. For example, a "bowl" classification can be mapped to Classification Embedding A, a "cup" classification can be mapped to Classification Embedding B, a "hat" classification can be mapped to Classification Embedding C, etc. Each classification embedding can be, for example, a vector of values that defines a position in a multidimensional common embedding space.

A neural network model that corresponds to the classification model can also be locally stored on the robot. The neural network model can be trained to generate embeddings of sensor data instances, and can be trained in cooperation with the classification model. For example, vision sensor data generated by a vision sensor of the robot (e.g., a monocular camera, stereographic camera, laser scanner) can be applied as input to the neural network model, and an embedding can be generated over the neural network model based on the applied input. The generated embedding can then be compared to one or more of the classification embeddings to determine a classification embedding that is most similar to the generated embedding. For example, where the generated embedding and the classification embeddings are each vectors of corresponding values, distance measures between the generated embedding and the classification embeddings can be generated, and the smallest distance measure can indicate the most similar classification embedding.

The classification corresponding to the most similar classification embedding can then be determined as the classification of an object captured by the vision sensor data. For example, the "bowl" classification can be determined as the classification of an object captured by the vision sensor data (i.e., based on the generated embedding being determined to be most similar to Classification Embedding A that is mapped to the "bowl" classification). The robot can then perform one or more actions directed toward the object. For example, the robot can pick up the object and provide audible output of "I'm picking up a bowl".

During or after performance of the action, user interface input can be received that indicates the classification is incorrect (e.g., spoken input of "that's not a bowl") and/or that indicates an alternative classification is instead the correct classification (e.g., spoken input of "that's a hat"). In response to the human correction, the locally stored classification model can be updated. For example, based on user interface input that indicates "hat" is the correct classification, Classification Embedding C (that is mapped to the "hat" classification) can be adjusted based on the generated embedding. For instance, Classification Embedding C can be adjusted to be more similar to the generated embedding. As one particular instance, the current Classification Embedding C and the generated embedding can be averaged, and the average utilized as a New Classification Embedding for the "hat" classification (e.g., the new Classification Embedding can supplant Classification Embedding C as the mapped classification embedding for the "hat" classification). As another example, based on the user interface input that indicates "bowl" is the incorrect classification, Classification Embedding A (that is mapped to the "bowl" classification) can be adjusted based on the generated embedding. For instance, Classification Embedding A can be adjusted to be less similar to the generated embedding.

It is noted that such adjustment(s) to the classification model can immediately improve performance of future classifications without necessitating retraining of the corresponding neural network model. For example, if additional vision sensor data is applied to the same (not further trained) neural network model to generate an additional embedding that is very similar to (or the same as) the generated embedding above, a "hat" classification may be determined (instead of a "bowl" classification) based on the New Classification Embedding for the "hat" classification.

Accordingly, classification performance can be quickly improved through adjustment of the classification model, without further computationally intensive and/or time consuming training of the neural network model. Such improved classification performance further leads to improvement in performance of various robotic actions that depend (directly or indirectly) on classifications of objects.

In some implementations, in response to determining a human correction, a correction instance can additionally or alternatively be generated and transmitted to one or more remote computing devices. The correction instance can include, for example, the sensor data applied to the neural network model, and correction information that is based on the human correction (e.g., that is indicative of correct feature(s) and/or that indicates determined feature(s) were incorrect). For example, and continuing with the example of the preceding paragraphs, in response to user interface input that indicates the "bowl" classification is incorrect, a correction instance can be generated and transmitted that includes: the vision sensor data applied to the neural network model in generating the incorrect "bowl" classification; and an indication that the "bowl" classification was incorrect. Also, for example and continuing with the example of the preceding paragraphs, in response to user interface input that indicates the alternative "hat" classification is instead the correct classification, a correction instance can be generated and transmitted that includes: the vision sensor data applied to the neural network model in generating the incorrect "bowl" classification; and an indication that "hat" is the correct classification.

The correction instance can be transmitted to one or more remote computing devices. The remote computing devices can utilize the correction instance to generate training example(s) for training of one or more neural network model(s), such as neural network model(s) that correspond to those used in determining the incorrect features(s) utilized in performing the action. In various implementations, the training of the neural network model(s) is based on correction instances received from multiple robots. The multiple robots that generate and provide the correction instances can be physically located in disparate geographic locations and/or environments and/or can vary from one another (e.g., vary hardware-wise and/or software-wise).

Once a revised version of a neural network model is generated, through training based on correction instances from multiple robots, the revised version of the neural network model can thereafter be utilized by one or more of the multiple robots. For example, one of the multiple robots may utilize the revised version in lieu of an earlier corresponding version that was utilized when one of the correction instances was generated by that robot. For instance, the revised version can be transmitted to that robot and that robot can replace a prior locally stored version with the revised version. In some implementations, a revised version of the features model that corresponds to the revised version of the neural network model can also be generated. For example, the revised version of the features model can include revised feature embeddings for various features (e.g., to correspond to the revised version of the neural network model), can include additional features and corresponding feature embeddings (e.g., where correction instances include "new" features), etc. The revised version of the features model can also thereafter be utilized by one or more of the multiple robots.

In some implementations, in response to receiving a "new" version of a neural network model, a robot may adapt a corresponding features model based on past human corrections. As one example, assume that the new version of the neural network model replaces an old version of the neural network model, and a new version of the features model replaces an old version of the features model. Further assume that the old version of the features model was previously updated, in response to a human correction, by adjusting a feature embedding of Feature A to be more similar to an embedding generated over the old version of the neural network model based on Vision Sensor Data X. The new version of the features model may be updated by generating a new embedding over the new version of the neural network model based on applying Vision Sensor Data X to the new version of the neural network model—and adjusting a feature embedding of Feature A (in the new version of the features model) to be more similar to the new embedding. In this manner, prior vision sensor data and prior correction information from past human corrections utilized to update a prior features model of a robot can be utilized by the robot to adjust a new version of the features model via embeddings generated over a new version of the neural network model.

In some implementations, determining a human correction of an action of a robot is based on user interface input received in association with performance of the action (i.e., before, during, or after performance of the action). The user interface input can be received via one or more sensors of the robot (e.g., a microphone of the robot, sensor(s) that can be utilized to determine human touch and/or human manipulation of the robot), and/or via a client device that is separate from, but in communication with, the robot (e.g., spoken or typed user interface input received via a tablet or smartphone).

Determining that user interface input indicates a correction can be based on analysis of the user interface input itself, and optionally based on feature(s) of the action being performed. For example, it can be based on one or more terms or other cues in the user interface input that indicate a correction (e.g., "no", "stop", "not"). Also, for example, it can additionally or alternatively be based on comparison of features(s) determined based on the user interface input to features (s) being utilized in performance of the action. For instance, comparison of "hat" and "bowl" to determine a conflict where the user interface input indicates a classification of an object is a "hat", whereas the action is being performed based on an incorrectly determined classification of "bowl" for the object. When the user interface input is natural language input (e.g., spoken or free-form typed input), a natural language processing (NLP) system and/or other components may optionally be utilized in determining that such user interface input is a correction.

In various implementations, updating a features model in response to human corrections as described herein enables the features model to be adapted in view of so-called "hard negative" instances. That is, the features model is updated as a result of an underlying incorrect determination made based on the pre-updated features model. In other words, the features model is updated based on an action performed by the robot based on what it deemed were correct feature(s), despite the feature(s) being incorrect and/or incomplete in actuality. Such adaptation may be more impactful than updating the features model on so-called "affirmative" instances where the underlying determinations are correct.

Further, various implementations that generate and transmit correction instances for utilization in generating training examples for training a neural network model, enable generation of so-called "hard negative" training examples. That is, the training examples are hard negatives since they are generated based on correction instances that are the result of an underlying incorrect determination made based on the neural network model corresponding to the one to be trained.

Examples of implementations are provided in the preceding paragraphs for purposes of providing an overview of some of those implementations. However, it is understood that various implementations described herein vary in one or more respects from the provided examples.

In some implementations, a method may be provided that includes determining a classification for an object in an environment of a robot. Determining the classification for the object includes: applying, as input to a neural network model locally stored on one or more computer readable media of the robot, sensor data that captures the object and that is generated by at least one sensor of the robot; generating, over the neural network model based on the applying, an embedding of the sensor data; applying the embedding of the sensor data to a classification model locally stored on one or more of the computer readable media of the robot; and determining the classification based on applying the embedding to the classification model. The method further includes receiving user interface input during performance of an action, by the robot, that is directed toward the object. The method further includes determining that the user interface input indicates the classification of the object is incorrect. The method further includes, in response to determining that the user interface input indicates the classification of the object is incorrect: updating the locally stored classification model. Updating the locally stored classification model occurs without retraining of the neural network model.

This method and other implementations of technology disclosed herein may each optionally include one or more of the following features.

In some implementations, determining that the user interface input indicates the classification of the object is incorrect includes determining that the user interface input indicates an alternative classification, of the object, that conflicts with the determined classification. In some of those implementations, updating the locally stored classification model includes updating the locally stored classification model based on the alternative classification. In some versions of those implementations, updating the locally stored classification model based on the alternative classification includes: identifying a current alternative classification embedding that is mapped to the alternative classification in the locally stored classification model; and
determining an adjusted alternative classification embedding based on the alternative classification embedding and based on the embedding of the sensor data. For example, determining the adjusted alternative classification embedding can be based on an average of the alternative classification embedding and the embedding of the sensor data. In some additional or alternative implementations, the method can further include: storing the sensor data and the alternative classification; and subsequent to updating the locally stored classification model: receiving a new version of the neural network model and a new version of the classification model; applying the sensor data as input to the new version of the neural network model; generating, over the new version of the neural network model based on the applying, a new embedding of the sensor data; identifying, in the new version of the classification model, a new alternative classification embedding of the alternative classification; and adjusting, in the new version of the classification model, the new alternative classification embedding of the alternative classification based on the new embedding of the sensor data. In some implementations, updating the locally stored classification model based on the alternative classification includes: determining that the locally stored classification model lacks any alternative classification embedding for the alternative classification; and in response, storing an alternative classification embedding in the locally stored classification model, the alternative classification embedding being based on the embedding of the sensor data. In some implementations, updating the locally stored classification model further includes: applying, as input to the neural network model, additional sensor data that captures the object and that is generated by the sensor of the robot; generating, over the neural network model based on the applying, a further embedding of the additional sensor data; and updating the locally stored classification model based on the further embedding and the alternative classification.

In some implementations, determining the classification based on applying the embedding to the classification model includes determining the classification based on determining that the embedding is more similar to a classification embedding mapped to the classification than it is to alternative classification embeddings mapped to alternative classifications. In some of those implementations, updating the locally stored classification model includes: determining an adjusted classification embedding for the classification based on modifying the classification embedding to be less similar to the embedding.

In some implementations, a method is provided that includes: applying, as input to a neural network model locally stored on one or more computer readable media of a robot, sensor data that captures an object and that is generated by at least one sensor of the robot; generating, over the neural network model based on the applying, an embedding of the sensor data; and determining a feature of the sensor data based on applying the embedding to a features model locally stored on one or more of the computer readable media of the robot. The features model maps the feature to a feature embedding of the feature and maps additional features to corresponding additional feature embedding. Determining the feature includes determining the feature based on similarity of the embedding of the sensor data to the feature embedding mapped to the feature. The method further includes: performing, based on the determined feature, a robotic action that is directed toward the object; receiving user interface input in response to performance of the robotic action that is directed toward the object; and determining that the user interface input indicates a particular additional feature of the additional features. The method further includes, in response to determining that the user interface input indicates the particular additional feature: adjusting, in the features model, the additional feature embedding of the particular additional feature based on the embedding of the sensor data.

This method and other implementations of technology disclosed herein may each optionally include one or more of the following features.

In some implementations, the feature is a first classification and the particular additional feature is a second classification.

In some implementations, the feature is a first bounding area and the additional feature is a second bounding area. In some of those implementations, the first bounding area is defined by a plurality of first pixels and the second bounding area is defined by a plurality of second pixels. In some of those implementations, the user interface input is generated at a client computing device based on a user indicating the second bounding area via the client computing device. The second bounding can be indicated via the client device during display of an image that is based on the sensor data. In some version of those implementations, the method further includes providing the image to the client device in response to initial user interface input that indicates the robotic action is incorrect.

In some implementations, a method is provided and includes: applying, as input to a neural network model locally stored on one or more computer readable media of the robot, sensor data that captures the object and that is generated by at least one sensor of the robot; generating, over the neural network model based on the applying, an embedding of the sensor data; and determining a feature of the sensor data based on applying the embedding to a features model locally stored on one or more of the computer readable media of the robot. The features model maps the feature to a feature embedding of the feature and maps additional features to corresponding additional feature embeddings. Determining the feature includes determining the feature based on the feature embedding mapped to the feature being more similar to the embedding of the sensor data than it is to any of the additional feature embeddings. The method further includes: performing a robotic action based on the determined feature; receiving user interface input in response to performance of the robotic action; and determining that the user interface input indicates the robotic action is incorrect. The method further includes, in response to determining that the user interface input indicates the robotic action is incorrect: updating the locally stored features model based on the embedding of the sensor data; generating a correction instance that includes the sensor data; and transmitting the correction instance to one or more remote computing devices via a network interface. The one or more remote computing devices use the correction instance to generate at least one training example for generating a revised version of the neural network model.

This method and other implementations of technology disclosed herein may each optionally include one or more of the following features.

In some implementations, the method further includes: receiving, via the network interface, the revised version of the neural network model. The revised version of the neural network model is received after the neural network model is trained based on: the training example, and additional training examples from additional correction instances from additional robots.

In some implementations, determining that the user interface input indicates the determined feature is incorrect comprises: determining that the user interface input indicates an additional feature, of the additional features, that conflicts with the determined feature. In some of those implementations, updating the locally stored features model based on the embedding of the sensor data includes: adjusting an additional feature embedding based on the embedding of the sensor data. The additional feature embedding is one of the additional feature embeddings and is mapped to the additional feature in the locally stored features model. In some versions of those implementations, the correction instance includes an indication of the additional feature. In some implementations, updating the locally stored features model based on the embedding of the sensor data includes: determining that the additional feature is not mapped to any of the additional feature embeddings in the locally stored features model; and in response, storing a particular feature embedding for the additional feature in the locally stored features model. The particular feature embedding is based on the embedding of the sensor data.

Other implementations may include a non-transitory computer readable storage medium storing instructions executable by a processor to perform a method such as one or more of the methods described above. Yet other implementations may include a system (e.g., a robot and/or one or more other components) including memory and one or more processors operable to execute instructions, stored in the memory, to implement one or more modules or engines that, alone or collectively, perform a method such as one or more of the methods described above.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
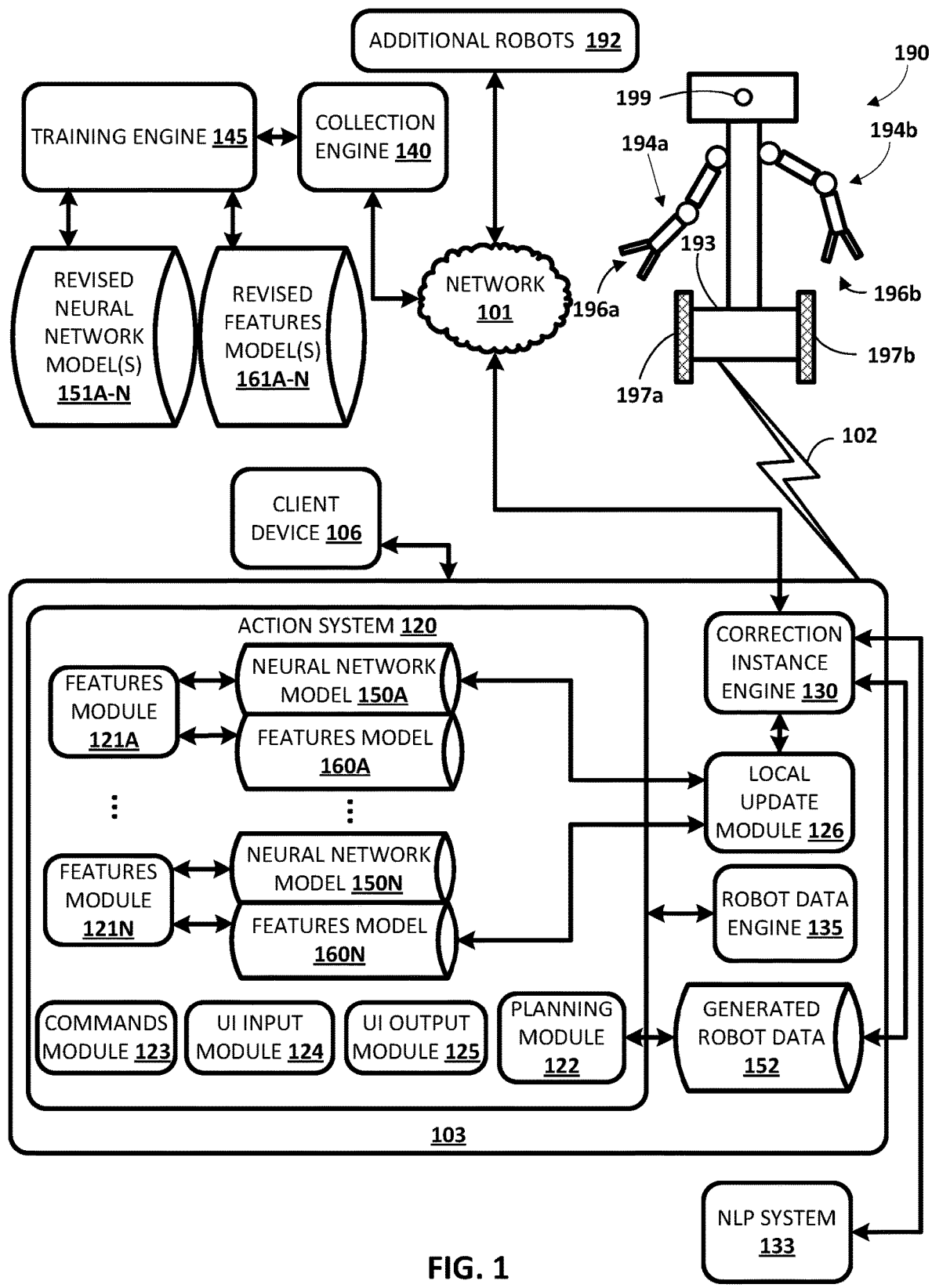
FIG. 1 illustrates an example environment in which implementations disclosed herein may be implemented.

FIG. 1 illustrates an example environment in which implementations disclosed herein may be implemented. The example environment includes a robot 190. Although a particular robot 190 is illustrated in FIG. 1, additional and/or alternative robots may be utilized, including stationary "robot arms", robots having a humanoid form, robots having an animal form, other robots that move via one or more wheels (e.g., other self-balancing robots, non-self-balancing robots), an unmanned aerial vehicle ("UAV"), and so forth.

The robot 190 includes robot arms 194a and 194b with corresponding grasping end effectors 196a and 196b, that each take the form of a gripper with two opposing actuable members. The robot 190 also includes a base 193 with wheels 197a and 197b provided on opposed sides thereof for locomotion of the robot 190. The base 193 may include, for example, one or more motors for driving corresponding wheels 197a and 197b to achieve a desired direction, velocity, and/or acceleration of movement for the robot 190.

The robot 190 also includes a vision sensor 199. The vision sensor 199 may be, for example, a stereographic camera, a monographic camera, or a 3D laser scanner. In some implementations, a stereographic camera includes two or more sensors (e.g., charge-coupled devices (CCDs)), each at a different vantage point. Based on sensor data generated by the two sensors at a given instance, vision sensor data that is three-dimensional ("3D") point cloud data may be generated for the given instance, where each of the 3D points of the 3D point cloud defines a 3D coordinate of a surface of a corresponding object. In some other implementations, a stereographic camera may include only a single sensor and one or more mirrors utilized to effectively capture sensor data from two different vantage points. A monographic camera can include a single sensor and captures two-dimensional ("2D") vision sensor data. A 3D laser scanner includes one or more lasers that emit light and one or more sensors that generate vision sensor data related to reflections of the emitted light. The generated vision sensor data from a 3D laser scanner may be 3D point cloud data. A 3D laser scanner may be, for example, a time-of-flight 3D laser scanner or a triangulation based 3D laser scanner and may include a position sensitive detector (PSD) or other optical position sensor.

As described herein, robot 190 may operate autonomously at least part of the time and control actuators thereof in performance of various actions. For example, in performing various actions, one or more processors of the robot 190 may provide control commands to actuators associated with the wheels 197a and/or 197b, the robot arms 194a and/or 194b, and/or the end effectors 196a and/or 196b.

Also illustrated in FIG. 1 are various components 103 that are utilized in performance of various actions by the robot 190, in determining human corrections to various actions performed by the robot 190, in updating features model(s) in response to determining human corrections to those various actions, and/or in generating and transmitting correction instances in response to determining human corrections to those various actions.

Although the components 103 are illustrated separate from the robot 190 in FIG. 1, connection element 102 indicates that those components 103 can be implemented on robot 190 and/or can be in network communication (e.g., via a local area network and/or a wide area network) with robot 190. For example, in some implementations, one or more (e.g., all) of the components 103 are implemented by hardware that is local to the robot 190. For instance, the action system 120, the local update module 126, the correction instance engine 130, and/or the robot data engine 135 may be implemented by one or more processors of the robot 190. Also, for instance, neural network model 150A, features model 160A, neural network model 150N, features model 160N, and/or generated robot data database 152 may be stored on one or more hard drives or other computer readable media of the robot 190. As another example, in some implementations one or more of the components 103 are implemented on one or more computing devices that are remote from the robot 190.

Components 103 include a robot data engine 135 that processes robot sensor data generated by robot sensors of the robot 190 and/or other data generated by components of the robot 190. For example, the robot data engine 135 may receive robot sensor data from various sensors of the robot, timestamp the robot sensor data, and provide the timestamped robot sensor data to the action system 120. The robot sensor data may include, for example, vision sensor data from vision sensor 199, position sensor data from position sensors of actuators of the robot, accelerometer data from accelerometer(s) of the robot, etc. The robot data engine 135 may further store, in generated robot data database 152, a log of at least some of the robot sensor data. For example, the robot data engine 135 may store a buffer of "recent" sensor data, clearing data from the buffer based on space, temporal, and/or other factors. The robot data engine 135 may further store, in generated robot data database 152, various other data generated by the robot 190 such as features determined by action system 120, control commands provided to actuators of the robot 190, etc.

The action system 120 uses robot sensor data provided by the robot data engine 135 in performing various robotic actions. The actions may include actions such as picking up an object, "picking and placing" an object, or navigating to a location—and/or relatively more complex collections of actions such as unloading a dishwasher, picking up all "toys" from a defined area, clearing a table of all objects, clearing a table of only certain type(s) of objects, retrieving certain types of objects from multiple rooms of a building, etc. The action system 120 may perform robotic actions in response to various cues. For example, the action system 120 can perform some robotic actions in response to user interface input provided by a human (e.g., perform a task "on demand" in response to spoken input). As other examples, the action system 120 may additionally or alternatively provide some actions based on a schedule (e.g., every weekday morning) and/or based on environmental conditions (e.g., remove items from an area when "messy").

The action system 120 can utilize various modules in performance of actions, examples of which are illustrated in FIG. 1. Features modules 121A-N of action system 120 determine various features for use by planning module 122 in determining how to execute an action. For example, features modules 121A-N can determine features that indicate poses (positions and/or orientations) of objects in the environment, features that indicate classes of objects in the environment of the robot 190, features that indicate how to grasp objects in the environment of the robot 190 (e.g., a bounding box that indicates a grasp pose for grasping end effector 196a and/or 196b), features that indicate weights, materials, and/or other physical characteristics of objects in the environment of the robot 190, etc. The planning module 122 can utilize such features in determining how to execute an action. For example, in clearing "dishes" from a table, the planning module 122 can use determined object poses and classifications to determine objects that are "dishes" and that are "on the table", and can utilize grasping features to determine how to grasp those objects in removing them from the table.

The commands module 123 generates control commands to provide to actuators of the robot 190 to effectuate actions determined by planning module 122. For example, the planning module 122 can be a higher level planner that generates paths and other higher level movements for performing an action, and the commands module 123 can be a real-time module that generates real-time control commands to provide to actuators of the robot 190 to effectuate those higher level movements.

Two features modules 121A and 121N are illustrated in FIG. 1. Features module 121A utilizes a corresponding neural network model 150A and features model 160A in generating corresponding features. Feature module 121N utilizes a corresponding neural network model 150N and features model 160N in generating corresponding features. It is understood that additional features modules may be provided, as indicated by the ellipsis in between features modules 121A and 121N. Further, one or more of those additional features modules may optionally utilize a corresponding neural network model and optional features model, as indicated by the additional ellipsis.

As one example, features module 121A can utilize neural network model 150A and features model 160A to effectively perform object recognition. For instance, the features module 121A can apply an instance of vision sensor data (provided by robot data engine 135) as input to neural network model 150A and generate an embedding over the model 150A based on the input. The features module 121A can then apply the generated embedding to the features model 160A to determine one or more poses that are most similar to the generated embedding. For example, the features model 160A may define bounding areas (e.g., a bounding box) that are each mapped to a corresponding feature embedding of the features model 160A, and the features module 121A can determine the feature embedding(s) with the greatest similarity (e.g., shortest distance to) the embedding generated over the neural network model. The features module 121A can use the bounding area(s) mapped to those feature embedding(s) to determine poses(s) of object(s) captured by the vision sensor data. For example, a bounding area may define a bounding box of pixels of the vision sensor data, and those pixels utilized to determine the pose of the object (e.g., the pose can correspond to the effective position of those pixels in the environment). This may be performed iteratively for each of multiple instances of vision sensor data to enable the features module 121A to determine poses for each of a plurality of objects in the robots environment—effectively enabling the features module 121A to maintain an up to date spatio-temporal "inventory" of objects in the robot's environment.

As another example, features module 121N can utilize neural network model 150N and features model 160N to effectively perform object classification of objects captured by vision sensor data. For example, to determine the classification of an object, the features module 121N can apply vision sensor data as input to neural network model 150N and generate, over the model 150N based on the input, an embedding of the vision sensor data. The features module 121N can then apply the generated embedding to the features model 160N to determine one or more classifications based on the generated embedding. For example, the features model 160N may define classifications that are each mapped to a corresponding classification embedding of the features model 160N, and the features module 121N can determine the classification embedding(s) with the greatest similarity (e.g., shortest distance to) the embedding generated over the neural network model. The features module 121N can use the classification(s) mapped to those classification embedding(s) to determine classification(s) of object(s) captured by the vision sensor data. In some implementations, the features module 121N can optionally also provide, as input to the neural network model 150A along with the vision sensor data, a pose of a particular object whose classification is to be determined (e.g., a pose determined by features module 121A). This can be used to generate an embedding that is based on the vision sensor data, but tailored particularly to the particular object (e.g., based on its position in the vision sensor data, as indicated by the pose).

Although particular examples of neural network models, features models, and features modules are provided in the preceding paragraphs, it is understood that additional and/or alternative neural network models, features models, and/or features modules may be provided. For example, an additional features module may apply vision sensor data and/or other data (e.g., feature(s) of other features module(s)) as input to a corresponding trained neural network model and generate, over the model based on the input, an embedding that can then be applied to a corresponding features model to determine grasping features that indicate where to grasp an object captured by the vision sensor data. For instance, the grasping features may be two grasping points indicated by two corners of a bounding box mapped to a feature embedding in the features model. Also, for example, one or more features modules may apply non-vision sensor data as input to a corresponding trained neural network model and generate, over the model based on the input, an embedding that can be applied to a corresponding features model to determine one or more features related to an environment of a robot. The non-vision sensor data can be from one or more of various sensors such as position sensor(s), tactile sensors, audio sensors (e.g., microphones), etc. The non-vision sensor data can optionally be applied as input along with vision sensor data that is also applied as input. For instance, the trained neural network model may be trained to accept, as input, both vision sensor data and non-vision sensor data.

The action system 120 also includes a UI output module 125. The UI output module 125 can generate user interface output to provide during performance of an action by the robot 190. The provided user interface output is in addition to the movements of the robot 190 in furtherance of performing the action, and provides a perceptible indication of one or more features determined by the features modules 121A-N. For example, the user interface output can be audible output provided via a speaker of the robot 190, where the audible output "speaks" a determined feature of an object being acted upon (or to be acted upon) by the robot 190. For instance, when the robot 190 is picking up an object classified by one of the features modules 121A-N as a "plate", the robot 190 may generate audible output of "picking up the plate." In other implementation, the UI output module 125 may additionally or alternatively provide visual and/or other non-audible user interface output. Providing user interface output that indicates a determined feature of an object enables its perception by a human in the environment of the robot 190. Perception of the user interface output enables the human to recognize if it is incorrect and, if so, provide a correction as described herein.

The action system 120 also includes a UI input module 124 that receives user interface input. For example, the UI input module 124 can receive spoken user interface input provided via a microphone of the robot 190, or user interface input provided by a client device 106 that is in communication with the UI input module 124. In some implementations, hardware associated with any microphone of the robot 190 may only be "actively listening" for a human correction in response to certain preceding input, such as a spoken "hot word" (e.g., "hey robot"), a selection of a hardware button (e.g., on the robot 190), a selection of a virtual button (e.g., rendered on the client device 106), etc.

User interface input provided by the client device 106 is provided in response to user interaction with input device(s) of the client device 106 (e.g., a microphone of the client device 106 and/or a virtual or hardware keyboard), and may optionally be pre-processed by the client device 106 and/or other component (e.g., spoken input pre-processed by converting it to textual input). In some implementations, the UI input module 124 can generate one or more features for use by the action system 120 based on the received user interface input. For example, for received user interface input of "clear the table", the UI input module 124 can process the input to determine features that indicate actions should be performed, by the robot 190, to remove all objects that are on a "table" object in the environment of the robot 190. Any features determined by the UI input module 124 can be provided to the planning module 122. The UI input module 124 can interact with NLP system 133 and/or one or more other components in determining features from received user interface input.

The UI input module 124 can additionally or alternatively work in conjunction with the correction instance engine 130. The correction instance engine 130 determines whether received user interface input indicates a correction to a robot action. If so, the correction instance engine 130 can cause the local update module 126 (described in more detail below) to perform a corresponding local update to one of the features models 160A-N and/or can itself generate and transmit a corresponding correction instance to collection engine 140 via network 101. In this manner, in various implementations the correction instance engine 130 may cause local update module 126 to perform a corresponding local update to one of the features models 160A-N, and/or may transmit correction instances, only when received user interface input indicates a correction to the robot action.

The correction instance engine 130 can utilize various techniques in determining that received user interface input indicates a correction to a robot action. In some implementations, where the received user interface input is natural language input (e.g., received via microphone of the robot 190 or received via the client device 106), the correction instance engine 130 can determine it indicates a correction based on semantic and/or other natural language processing of the natural language input. The correction instance engine 130 may optionally interact (e.g., via the Internet or other network(s)) with NLP system 133 or other external resource(s) in processing of natural language input. The NLP system 133 can process natural language input and provide various annotations of the natural language input. For example, the NLP system 133 can provide sentiment annotations (e.g., using a sentiment classifier), entity annotations (that annotate included entities generally and/or specifically), annotations that provide a full semantic interpretation of natural language input, etc.

In some implementations, correction instance engine 130 determines that user interface input indicates a correction to an action based on comparison of the input to a feature used by the action system 120 in performance of the action. For example, assume that natural language input of "that's a bowl" is received while the robot 190 is interacting with an environmental object that the features module 121N has determined is a "cup". The correction instance engine 130 may determine that the user interface input indicates a correction to the action based on the conflict between the "bowl" classification indicated by the natural language input and the "cup" classification determined by the features module 121N. As described herein, in some implementations the UI output module 125 may provide audible or other user interface output during interaction with the environmental object, which may prompt a human to provide the user interface input of "that's a bowl".

In some implementations, correction instance engine 130 determines a correction to an action of the robot based on use interface input that is not natural language user interface input. For example, the user interface input can be based on the user actuating an "error" button on the robot 190, the user "grabbing" the robot 190 (e.g., as sensed based on "exterior" touch-sensitive sensors and/or force-torque or other "internal" sensor(s)), the user interacting with a graphical user interface via the client device 106 (e.g., an interface that enables the user to monitor the status of the robot 190 and report errors generally and/or specifically).

The correction instance engine 130 interacts with the local update module 126 of action system 120 to cause the local update module 126 to update one or more of the features models 160A in response to determining a human correction of an action performed by the robot 190. For example, the correction instance engine 130 can provide, to the local update module 126, and indication that a feature is incorrect and/or that an additional feature is instead correct (or is also correct). In response, the local update module 126 can update a corresponding features model based on the embedding (generated over a corresponding neural network model) that was utilized to determine the incorrect feature. For instance, assume features module 121N applied vision sensor data as input to neural network model 150N, generated Embedding A based on the input, and determined Feature A based on applying Embedding A to the features model 160N. Further assume the correction instance engine 130 indicates that Feature A is incorrect and that Feature B is instead correct. The local update module 126 may update the features model 160A to cause Feature B Embedding for Feature B to be more similar to Embedding A and/or to cause Feature A Embedding for Feature A to be less similar to Embedding A.

In some implementations, the correction instance engine 130 additionally and/or alternatively generates a correction instance in response to determining a human correction of an action performed by the robot 190. The correction instance generated by correction instance engine 130 in response to determining a correction can include, for example, the sensor data applied to the neural network model associated with the human correction (i.e., that utilized to generate the incorrect or incomplete feature(s)), and correction information that is based on the human correction (e.g., that is indicative of correct feature(s) and/or that indicates determined feature(s) were incorrect).

The collection engine 140 receives correction instances from correction instance engine 130 via network 101 (e.g., the Internet). The collection engine 140 may also receive correction instances from additional robots 192 via the network 101. The additional robots 192 can be in various geographic locations and the additional robots 192 may optionally vary from the robot 190 (e.g., they may be different "types", such as a type with four wheels). The correction instances provided by the additional robots 192 can include those that are also generated in response to a human correction of a robot action. The collection engine 140 can be implemented by, for example, a cluster of computing devices.

The collection engine 140 utilizes the correction instances that correspond to a given neural network model and features model to generate training examples for training of the neural network model and the features model. As one example, assume a correction instance is received that includes an instance of vision sensor data that capture a particular object, an indication that the particular object was incorrectly classified as a "bowl", and an indication that the classification was corrected to "hat" (via a human correction). In such an example, the collection engine 140 can generate a training example that includes: training example input that is based on a corresponding instance of the vision sensor data; and training example output that indicates "bowl" is not a correct classification and/or that "hat" is a correct classification.

The collection engine 140 provides generated training examples to training engine 145. The training engine 145 utilizes the training examples to train one or more corresponding neural network models and features models to generate corresponding revised neural network models 151A-N and revised features models 161A-N. As one example, assume the collection engine 140 provides a large number of training examples generated based on human corrections to incorrect classifications of objects by one or more instances of neural network model 150N and features model 160N. In such an example, the training engine 145 may further train the neural network model 150N (or another model similar to neural network model 150N) and features model 160N to generate revised neural network model 151N and revised features model 161N. For example, the training engine 145 can apply training example input of a training example to the neural network model 150N, generate an embedding based on the training example, apply the embedding to the features model 160N, determine an error based on the feature indicated by the training example output and the actual feature indicated based on the application of the embedding to the features model 160N, and backpropagate the error through the features model 160N and/or the neural network model 150N to update the features model 160N and/or the neural network model 150N. Batch training may optionally be utilized.

Through application of a large quantity of training examples, the training engine 145 generates a revised neural network model 151N and/or a revised features model 161N. The revised neural network model 151N and/or revised features model 161N can then be provided for utilization in lieu of the neural network model 150N and/or the revised features model 161N. Additionally, such revised neural network model 151N and/or revised features model 161N can further be revised by the training engine 145 in the future, based on subsequently generated training examples, to generate a further revised version of the revised neural network model 151N and/or revised features model 161N that can then be provided for utilization. In this manner, improved neural network models and features models may be iteratively trained and provided, using training examples that are based on correction instances from robots 190 and 192 that are in diverse environments. The training engine 145 can be implemented by, for example, a cluster of computing devices.

In some implementations, in response to receiving a "new" version of a neural network model, the local update module 126 of the robot 190 may adapt a corresponding features model based on past human corrections. As one example, assume that a revised neural network model 151N replaces neural network model 150N, and a revised features model 161N replaces features model 160N. Further assume that local update module 126 previously updated features model 160N, in response to a human correction, by adjusting a feature embedding of Feature A (of features model 160N) to be more similar to an embedding generated over neural network model 150N based on Vision Sensor Data X. The local update module 126 may locally store features of the previous update, such as Vision Sensor Data X and an indication of "Feature A", and utilize the stored previous update to update the revised features model 161N. For example, the local update module 126 can update the revised features model 161N by generating a new embedding over the revised neural network model 151N based on applying Vision Sensor Data X to the revised neural network model 151N—and adjusting, in the revised features model 161N, a feature embedding of Feature A (of revised features model 161N) to be more similar to the new embedding.

With reference now to FIGS. 2A-8, additional description of various components of the example environment of FIG. 1 are provided.

Figure 2A:
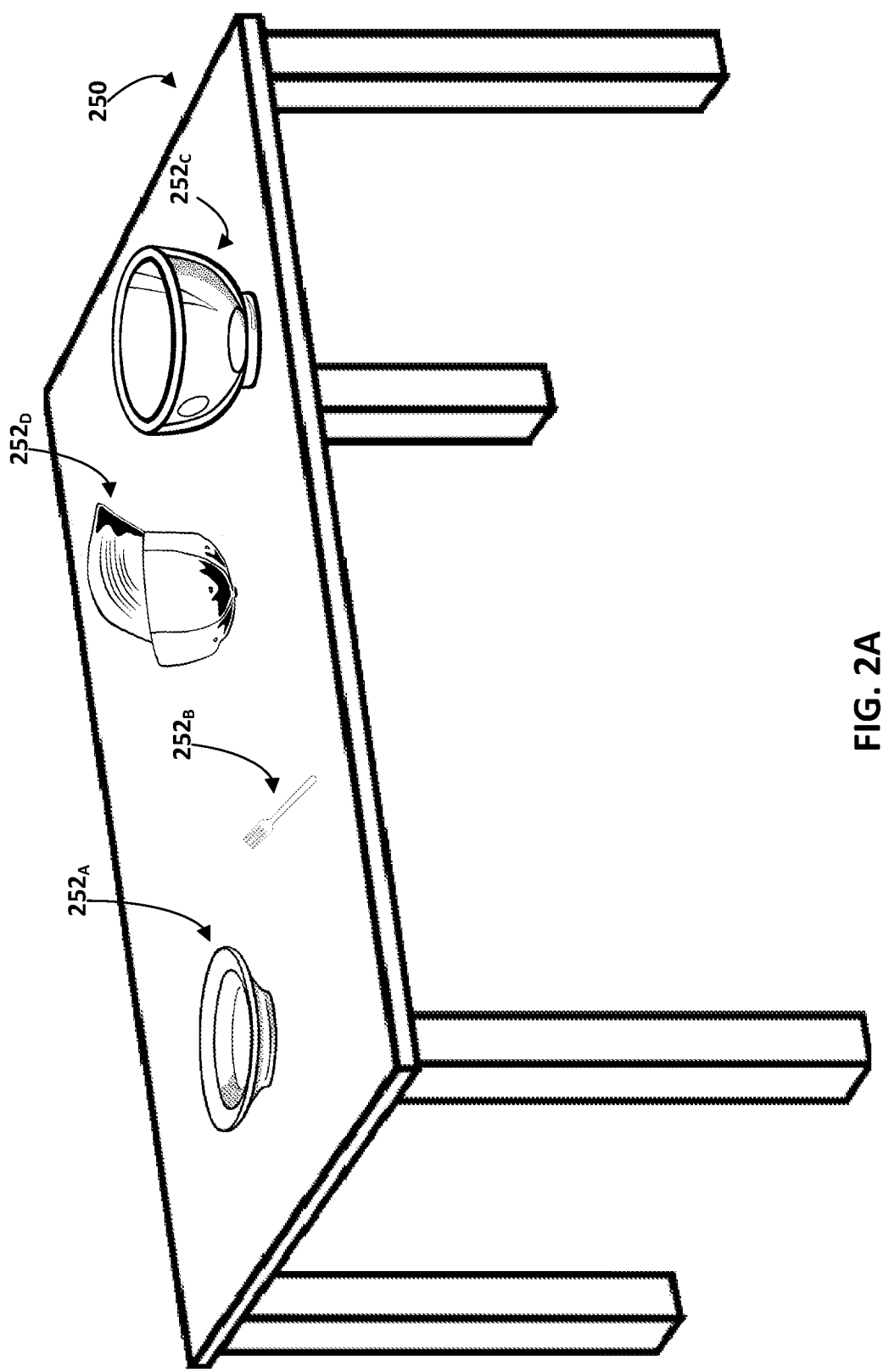
FIGS. 2A, 2B, 2C, and 2D illustrate examples of providing corrections to robot actions.

Turning initially to FIGS. 2A-2D, some examples of providing corrections to robot actions are provided. FIGS. 2A-2D depict various states of an example environment in which the robot 190 and/or other robot(s) may operate. FIG. 2A illustrates a table 250 at a first time. At the first time, four objects $252_{A-D}$ are placed on top of the table 250.

Figure 2B:
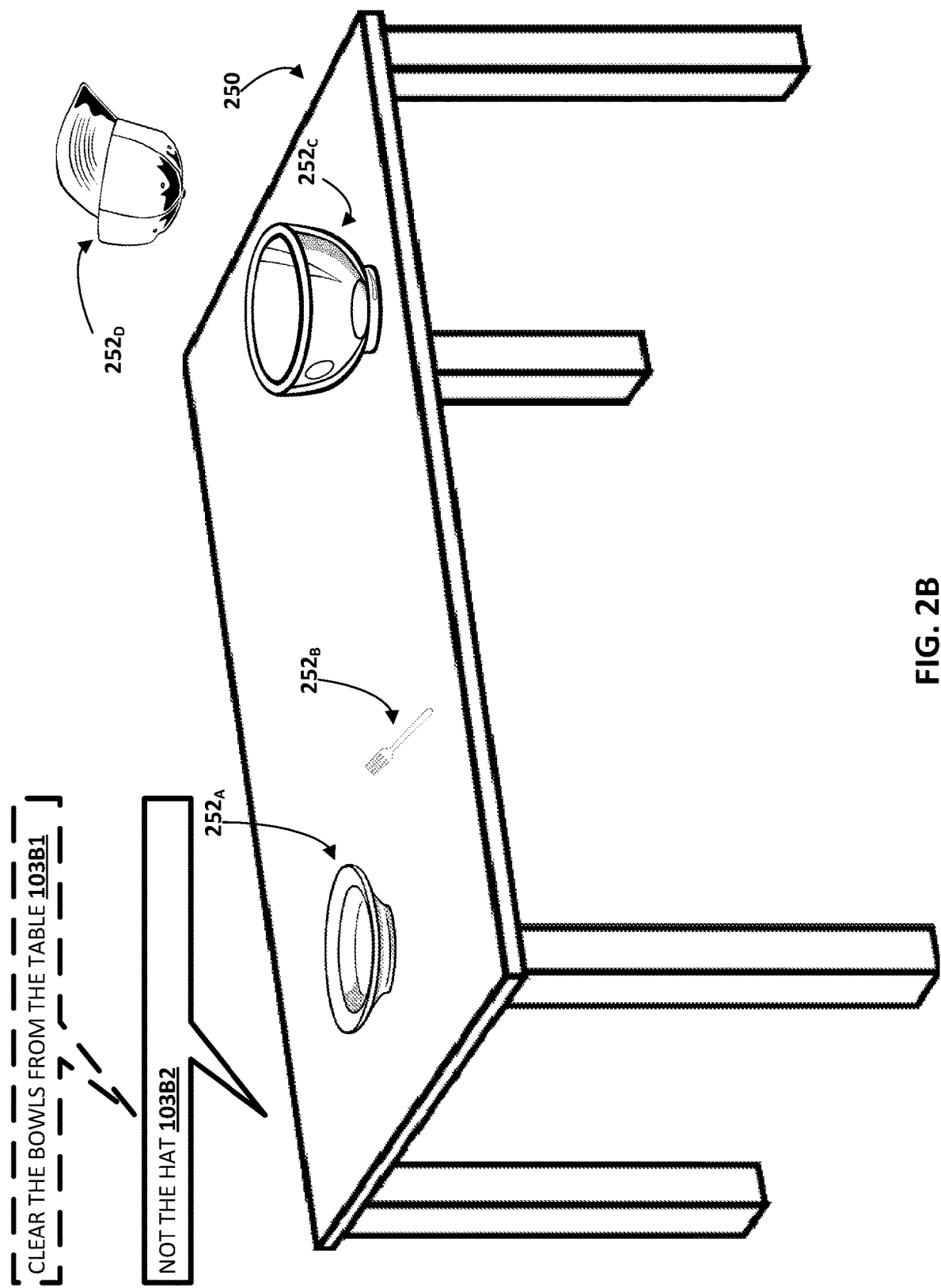

FIG. 2B illustrates an example where, at the first time of FIG. 2A, a user has provided user interface input 103B1 of "clear the bowls from the table". In response, the robot 190 (not depicted in FIG. 2B) may begin removing, from the table 250, objects that it has classified as "bowls". For example, it can begin removing any object classified as a "bowl" by the features module 121N (based on application of an embedding, generated over neural network model 150N, to features model 160N). For instance, FIG. 2B illustrates the environment when the robot 190 is grasping and removing object $252_D$ from the table 250, which it has incorrectly classified as a "bowl". While the robot 190 is interacting with the object $252_D$, the user provides further user interface input 103B2 of "not the hat".

The correction instance engine 130 can determine the further user interface input 103B2 indicates a correction to the action being performed on the object $252_D$. For example, the correction instance engine 130 can determine that the "hat" classification, indicated by the user interface input 103B2, conflicts with the incorrectly determined "dish" classification. In response, the correction instance engine 130 can interact with the local update module 126 to cause the local update module 126 to update the features model 160N. For example, the correction instance engine 130 can provide, to the local update module 126, an indication that the "bowl" classification was incorrect and that "hat" is instead the correct classification. In response, the local update module 126 can update the features model 160N based on the embedding, generated over neural network model 150N, that was utilized to determine the incorrect feature. For instance, if a feature embedding for a "hat" classification is already present in the features model 160N, the local update module 126 can adjust that feature embedding to make it more similar to the embedding generated over the neural network model 150N that was utilized to determine the incorrect "bowl" classification. Also, for instance, if a feature embedding for a "hat" classification is not present in the features model 160N, the local update module 126 can generate a feature embedding for "hat" in the features model 160N. For instance, the feature embedding for "hat" can be based on the embedding generated over the neural network model 150N that was utilized to determine the incorrect "bowl" classification. As described herein, in some implementations the correction instance engine 130 may additionally and/or alternatively generate and transmit a correction instance based on determining that the further user interface input 103B2 indicates a correction to the action being performed on the object $252_D$.

Figure 2C:
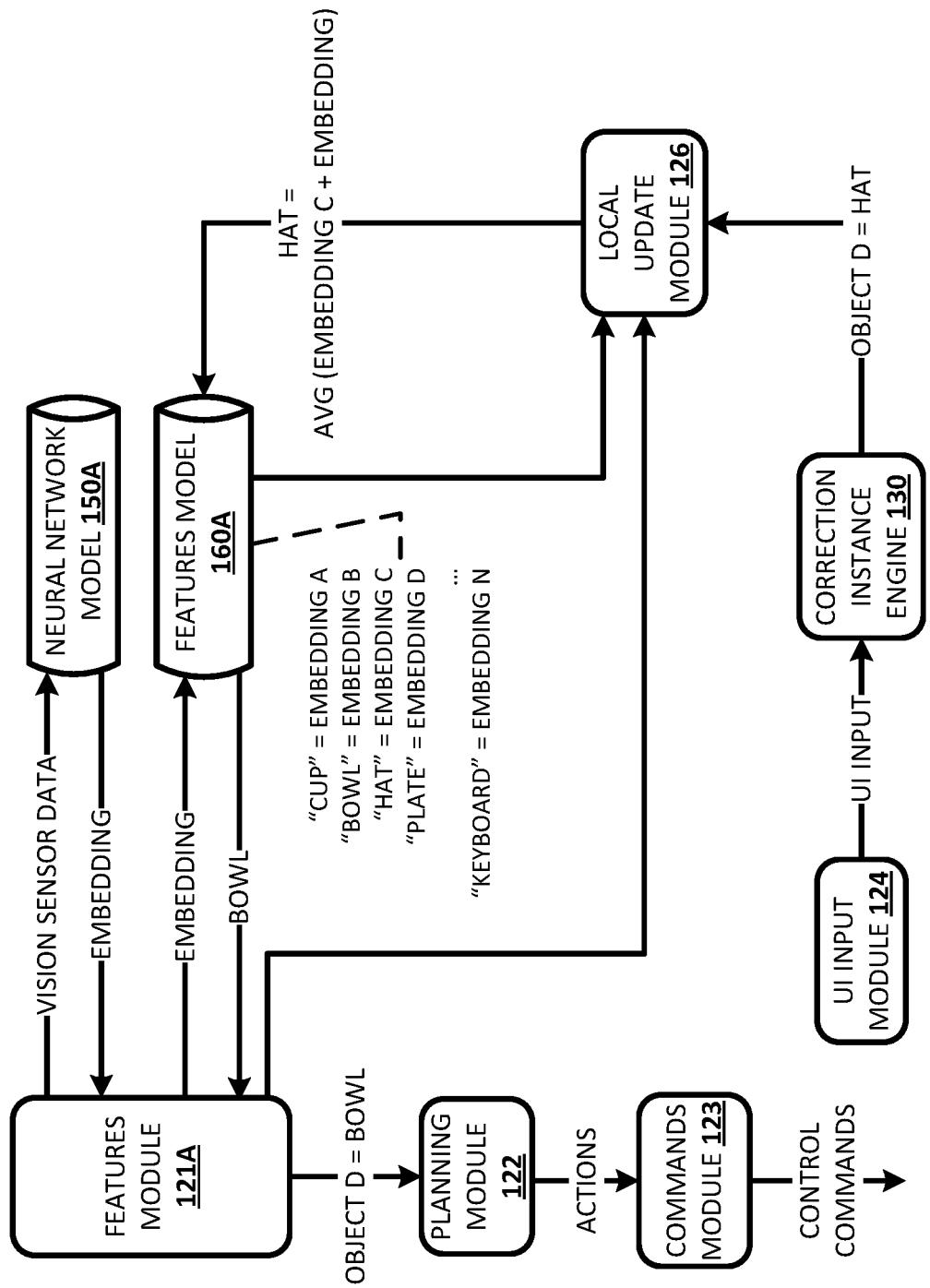

FIG. 2C illustrates an example of interactions between components of FIG. 1 that may occur during the example of FIG. 2B. In FIG. 2C, the features module 121A applies vision sensor data as input to the neural network model 150A, and generates an embedding based on that application. The features module 121A further applies the embedding to the features model 160A and determines a classification of "bowl" based on that application. For example, the features module 121A can determine the "bowl" classification based on the embedding being more similar to Feature embedding B of the features model 160A (illustrated in FIG. 2C as mapped to "bowl") than it is to any other of the Feature Embeddings A and C-N.

The features module 121A provides, to planning module 122, an indication that "object D" (corresponding to the hat of FIGS. 2A and 2B) has a "bowl" classification. For example, the features module 121A can provide, to the planning module 122, a pose and/or other unique identifier of "object D", along with an indication of its classification.

The planning module 122 utilizes the classification for "object D" to determine one or more actions to be performed. In determining the action(s), the planning module 122 may also rely on other classifications determined by features module 121A and/or other features from other features module(s). The planning module 122 provides the actions to commands module 123, which generates and provides control commands to one or more actuators (not illustrated in FIG. 2C) to effectuate performance of the action.

During or after performance of the action, UI input module 124 receives UI input and provides the UI input (and optionally annotations of the UI input) to correction instance engine 130. Correction instance engine 130 utilizes the UI input to determine that the classification for "object D" is incorrect, and should instead be a "hat" classification.

The correction instance engine 130 provides an indication of the correct "hat" classification to local update module 126. In response, the local update module 126 updates Feature Embedding C (illustrated in FIG. 2C as mapped to "hat") to be more similar to the embedding generated by the features module 121A in incorrectly determining the "bowl" classification.

Figure 2D:
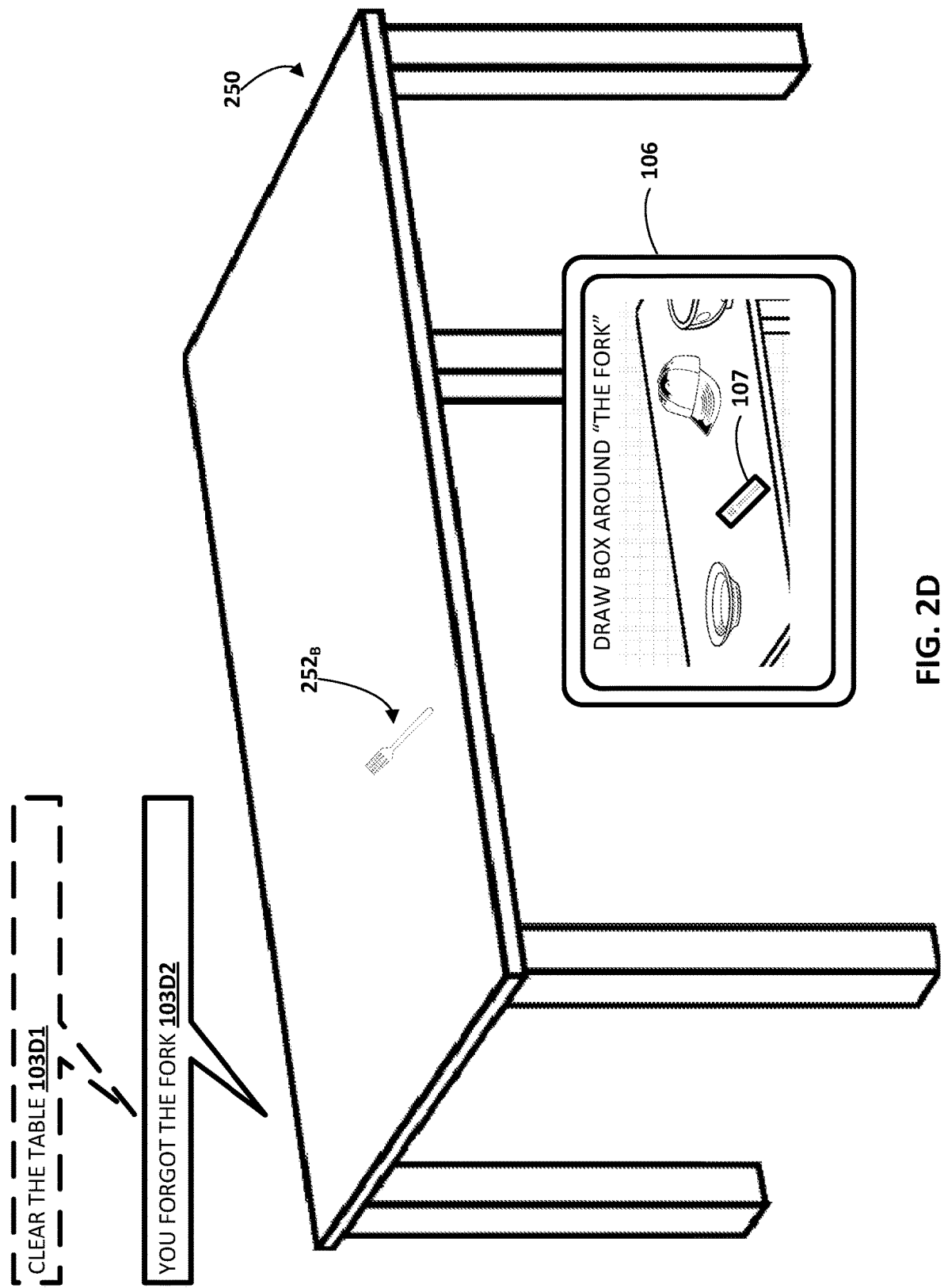

FIG. 2D illustrates an example where, at the first time of FIG. 2A, a user has provided user interface input 103D1 of "clear the table" (instead of providing the user interface input 103B1 of FIG. 2B). In response, the robot 190 (not depicted in FIG. 2D) can remove, from the table 250, all objects that is has identified. For example, it can remove any object detected as an object by the features module 121A. For instance, the features module 121A can apply one or more instances of vision sensor data to the neural network model 150A and generate a corresponding embedding based on each application. The features module 121A can further apply each embedding to the features model 160A to determine one or more bounding boxes that each indicate a pose of a corresponding object on the table 250. For example, features model 160A may map Feature Embedding A to a combination of Bounding Box A and Bounding Box B. Features module 121A can determine that a given embedding (generated over the neural network model 150A) is most similar to Feature Embedding A and, as a result, select Bounding Box A and Bounding Box B (based on those bounding boxes being mapped to Feature Embedding A). The features module 121A can detect an object (e.g., $252_A$) based on Bounding Box A and determine it has a pose corresponding to Bounding Box A. The features module 121A can also detect an object (e.g., $252_C$) based on Bounding Box B and determine it has a pose corresponding to Bounding Box B. Object $252_D$ may also be detected based on an additional embedding that is based on additional vision sensor data.

FIG. 2D illustrates the environment when the robot 190 has completed removing all objects that it has identified. However, the object $252_B$ remains on the table 250 due to it not being recognized, by the robot 190, as an object that is separate from the table 250. For example, the features module 121A may have failed to detect the object $252_B$. For instance, a bounding box that corresponds to the pose of the object $252_B$ may be included in the features model 160A and mapped to Feature embedding X. However, the features module 121A may not have selected that bounding box based on embeddings (generated over neural network model 150A) not having at least a threshold degree of similarity to Feature embedding X.

In FIG. 2D, the user provides further user interface input 103D2 of "you forgot the fork". In some situations, the user may provide the further user interface input 103D2 in response to audible user interface output (e.g., "I'm done", a "chime") provided by the robot 190 to indicate it has completed removing all objects that it has identified.

The correction instance engine 130 can determine the further user interface input 103D2 indicates a correction to the action being performed. For example, the correction instance engine 130 can determine that the user interface input 103D2 indicates that an object present on the table 250 was not recognized.

In response, the correction instance engine 130 can interact with the local update module 126 to cause the local update module 126 to update the features model 160N. In response, the local update module 126 requests further correction details via the client device 106. As illustrated in FIG. 2D, the local update module 126 provides (via network) an image of the table 250 to the client device 106 and requests that the user draw a box around the "fork". The image of the table 250 can be based on, for example, an instance of vision sensor data on which the incomplete objects were detected. The user provides user interface input to draw a box 107 around the fork (e.g., using a touch-screen of the client device 106). The local update module 126 can identify, in local model 160A, a corresponding bounding box that corresponds to box 107. Further, the local update module 126 can update a feature embedding, that is mapped to the corresponding bounding box, to cause that feature embedding to be more similar to an embedding generated over the neural network model 150A (e.g., an embedding generated based on the vision sensor data utilized to generate the image of the table 250 on the client device 106). In this manner, the local update module 126 solicits input from the user for the correct feature (the bounding box), and updates a feature embedding for that feature in the features model 160A based on an embedding generated over the neural network model 150.

As described herein, in some implementations the correction instance engine 130 may additionally and/or alternatively generate and transmit a correction instance based on determining that the further user interface input 103D2 indicates a correction to the action.

Figure 3:
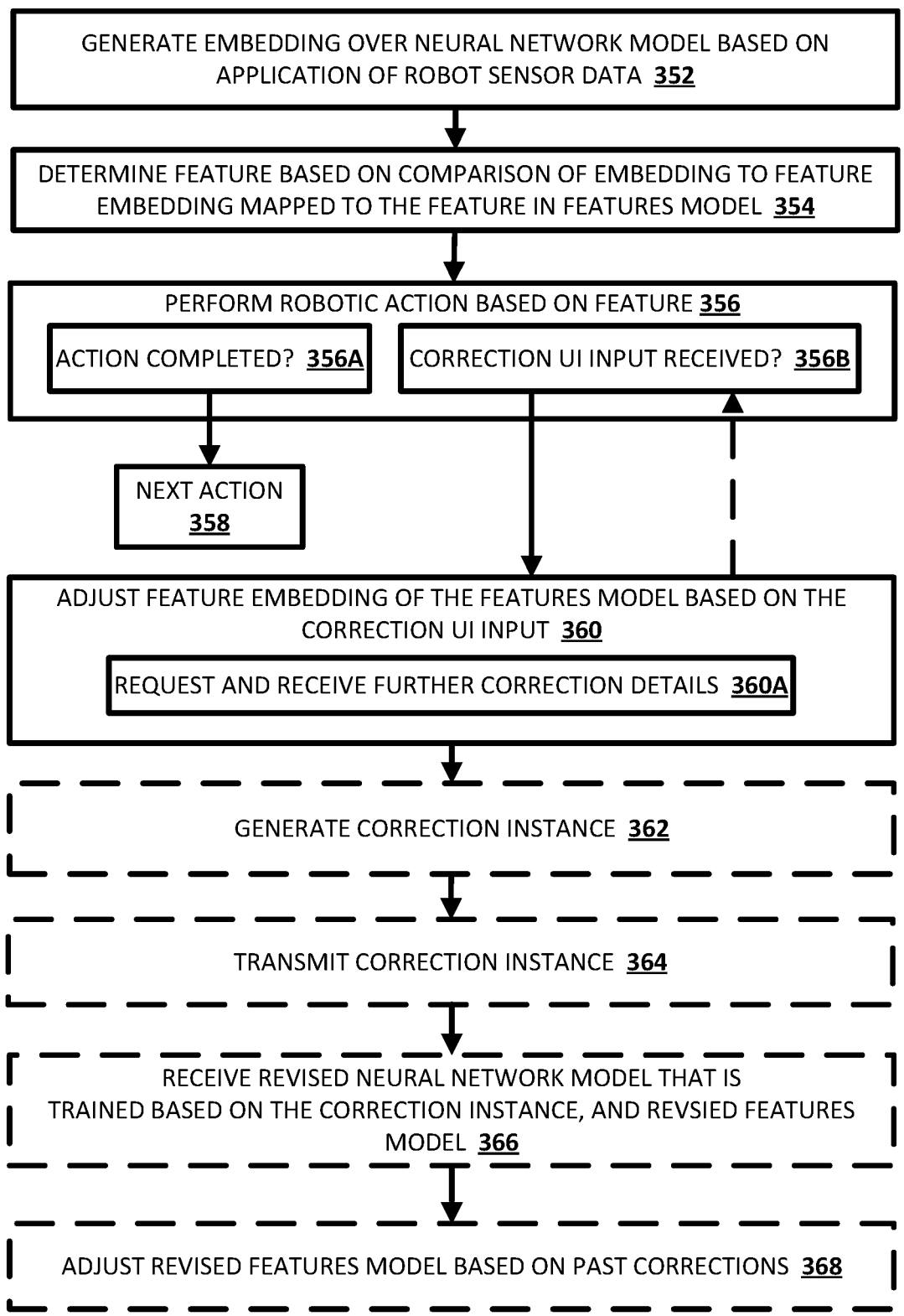
FIG. 3 is a flowchart illustrating an example method according to implementations disclosed herein.

Referring now to FIG. 3, an example method 300 according to various implementations is described. For convenience, the operations of the flowchart are described with reference to a system that performs the operations. This system may include various components of a robot and/or of one or more computing devices in communication with the robot. Moreover, while operations of method 300 are shown in a particular order, this is not meant to be limiting. One or more operations may be reordered, omitted or added.

At block 352, the system generates an embedding over a neural network model based on application of robot sensor data to the neural network model. As a working example, the system can apply, as input to the neural network model, vision sensor data that captures an object.

At block 354, the system determines at least one feature based on a comparison of the embedding to a feature embedding mapped to the feature in a features model. Continuing with the working example, the features model can map grasping parameters to corresponding feature embeddings. For example, Grasping Parameters A can be mapped to Feature embedding A, Grasping Parameters B can be mapped to Feature embedding B, etc. The system may select Feature embedding A based on similarity of that feature embedding to the embedding generated at block 352.

It is noted that in various implementations the system can determine feature(s) at block 354 based on multiple instances of output generated based on multiple instance of block 352, with each instance of block 352 applying a different instance of sensor data. Also, it is noted that in various implementations the system can determine feature(s) at block 354 based on feature(s) determined based on additional output generated over other neural network model(s) that are in addition to that of block 352.

At block 356, the system performs a robotic action based on the at least one feature generated at block 354. Continuing with the working example, the system can perform all or part of grasping of the object, with the determined grasping parameters.

Block 356 includes sub-blocks 356A and 356B. At block 356A the system monitors for completion of the action. If the system determines the action is completed, the system proceeds to block 358 and begins performance of a next action.

At block 356B, the system monitors for receipt of correction user interface input. The system can monitor for the receipt of correction user interface input before, during, or after (e.g., for at least a threshold duration after) the performance of the action. If correction user interface input is received, the system proceeds to block 360.

Continuing with the working example, assume the system has grasped the object and, while still grasping the object, user interface input of "not like that" is received. In such an example, the system can determine "not like that" is correction user interface input, and proceed to block 360. It is noted that in many scenarios, the system receives correction UI input at block 356B even though the performance of the action, from the system's perspective, is correct. In other words, absent the correction user interface input, the system would not self-recognize the incorrect nature of the performance of the action.

At block 360, the system adjusts the feature embedding of the features model based on the correction user interface input. Continuing with the working example, in response to the correction instance indicating the grasp, based on the grasping parameters mapped to Feature Embedding A, is incorrect—the system can adjust Feature Embedding A to be less similar to the embedding generated at block 352.

In some implementations, block 360 includes sub-block 360A, in which the system requests and receives further correction details. Continuing with the working example, the system may provide user interface output of "can you show me the right way to pick it up?". In response, the user can kinesthetically teach the correct grasp by physically manipulating the robot. For instance, the system may cause the robot to be in a low mechanical impedance, "gravity-compensated" mode, during which the user can physically manipulate the robot to demonstrate the correct grasp. In such an instance, the system can record sensor data to determine the correct grasping parameters for the object. The system can then adjust a feature embedding of the features model that corresponds to the correct grasping parameters. For example, the system can adjust that feature embedding to be more similar to the embedding generated at block 352.

At optional block 362, the system generates a correction instance. The correction instance can include vision sensor data and/or other robot sensor data that is relevant to the correction. For example, the system can include certain robot sensor data based on it being applied at block 352 to generate the embedding. In some implementations, the system also includes in the correction instance: the feature(s) determined at block 354, correction information that is based on the correction user interface input received at block 356B and/or the further correction details received at block 360A, and/or other data.

Continuing with the working example, the system can provide a correction instance that includes the vision sensor data applied at block 352, and that includes the correct human demonstrated grasping features determined at block 360A.

At optional block 364, the system transmits the correction instance generated at block 362. For example, the system can transmit the correction instance to a remote computing device via one or more networks.

At block 366, the system receives a revised neural network model that is trained based on the correction instance, and receives a revised features model for the revised neural network model. In some implementations, the revised neural network model and revised features model are trained based on training example(s) generated based on the correction instance and based on other training examples generated based on other correction instances from a plurality of additional robots. It is understood that in many implementations there will be a time delay (e.g., hours, days, weeks) between block 364 and block 366. In the interim, the system may continue to utilize the "prior" neural network model and its locally updated features model in performing other actions.

At optional block 368, the system adjusts the revised features model based on past corrections, such as the correction determined at block 360. For example, the system may have stored the robot sensor data applied at block 352, as well as the correction information determined at block 360. The system may apply the stored robot sensor data as input to the revised neural network model, generate an embedding over the revised neural network model based on the input, and adjust feature embedding(s) of the revised features model based on the correction details and the embedding. Continuing with the working example, an embedding can be generated over the revised neural network model based on applying the vision sensor data, and the feature embedding mapped (in the revised features model) to the "correct grasping parameters" updated to be more similar to the generated embedding.

The system can utilize the revised neural network model and the (optionally revised at block 366) features model in lieu of prior versions of those models.

Figure 4:
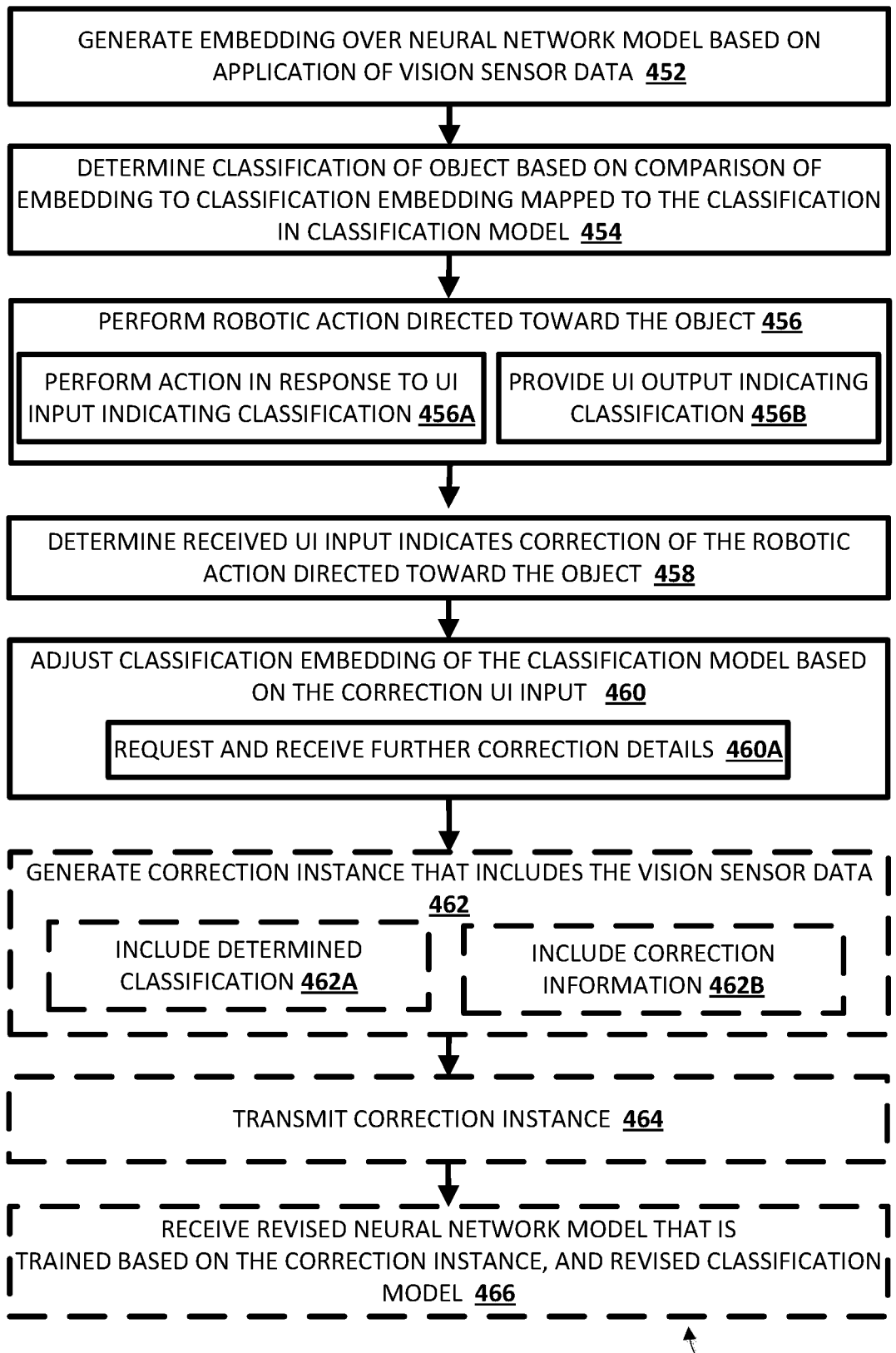
FIG. 4 is a flowchart illustrating another example method according to implementations disclosed herein.

Referring now to FIG. 4, another example method 400 according to various implementations is described. It is noted that method 400 illustrates a particular implementation of the method 300 of FIG. 3.

For convenience, the operations of the flowchart of FIG. 4 are described with reference to a system that performs the operations. This system may include various components of a robot and/or of one or more computing devices in communication with the robot. Moreover, while operations of method 400 are shown in a particular order, this is not meant to be limiting. One or more operations may be reordered, omitted or added.

At block 452, the system generates an embedding over a neural network model based on application of vision sensor data to the neural network model.

At block 454, the system determines at least one classification of an object captured by the vision sensor data. The system determines the classification based on comparison of the embedding generated at block 452 to a classification embedding mapped to the classification in a classification model. A classification model is one particular type of features models that maps classification embeddings (a particular type of feature embeddings) to corresponding classifications.

At block 456, the system performs a robotic action directed toward the object. For example, the system can move one or more of components of a robot closer toward and/or in contact with the object in grasping or otherwise contacting the object, in getting a better view of the object, etc.

Block 456 optionally includes blocks 456A and/or 456B.

At block 456A, the system performs the robotic action in response to user interface input indicating a classification of the object. For example, the system can perform the action directed toward the object based on received user interface indicating the classification for the object determined at block 452. As a working example, in response to user interface input of "find the remote control", the system can perform an action directed toward an object it has determined has a "remote control" classification.

At block 456B, the system provides user interface output indicating the classification for the object determined at block 456B. For example, before and/or during performance of the robotic action, the system can provide audio output of "picking up the remote control".

At block 458, the system determines that received user interface input indicates correction of the robotic action directed towards the object. Continuing with the working example, in performing a robotic action of picking up what the system has deemed a "remote control", the system can receive user interface input of "not the phone". The system can determine the received user interface input indicates a correction based on the presence of "not" and/or based on determining a conflict between "phone" and "remote control".

At block 460, the system adjusts the classification embedding of the classification model based on the correction UI input. Continuing with the working example, in response to the correction instance the system can adjust the classification embedding mapped to the "remote control" classification to be less similar to the embedding of block 452. Additionally or alternatively, the system can adjust the classification embedding mapped to the "phone" classification to be more similar to the embedding of block 452.

In some implementations, block 460 includes sub-block 460A, in which the system requests and receives further correction details. For example, if the received user interface input of block 458 was "no, not that" (and didn't identify "the phone"), the system may provide user interface output of "can you tell me what I incorrectly picked up?". In response, the user can provide further spoken input of "the phone". Based on such further spoken input, the system can adjust the classification embedding mapped to the "phone" classification to be more similar to the embedding of block 452.

At optional block 462, the system generates a correction instance that includes the vision sensor data applied at block 452. In some implementations, block 462 includes sub-blocks 462A and/or 462B. At block 462A, the system includes the determined classification of the object in the correction instance. That is, the determined classification that was incorrectly determined at block 454. At block 462B, the system includes correction information in the correction instance. The correction information can include, for example, an indication of a human provided classification provided at block 458 or block 460A. Additional and/or alternative data may optionally be included by the system in the correction instance.

At block 464, the system transmits the correction instance generated at block 460. For example, the system can transmit the correction instance to a remote computing device via one or more networks.

At block 466, the system receives a revised neural network model that is trained based on the correction instance, and a revised classification model that is trained based on the correction instance (and/or trained in view of the revised neural network model). In some implementations, the revised neural network model and/or the revised classification model are trained based on training example(s) generated based on the correction instance and based on other training examples generated based on other correction instances from a plurality of additional robots. In some implementations, the system may adjust the received revised classification model based on past corrections, such as the correction determined at block 458.

Figure 5:
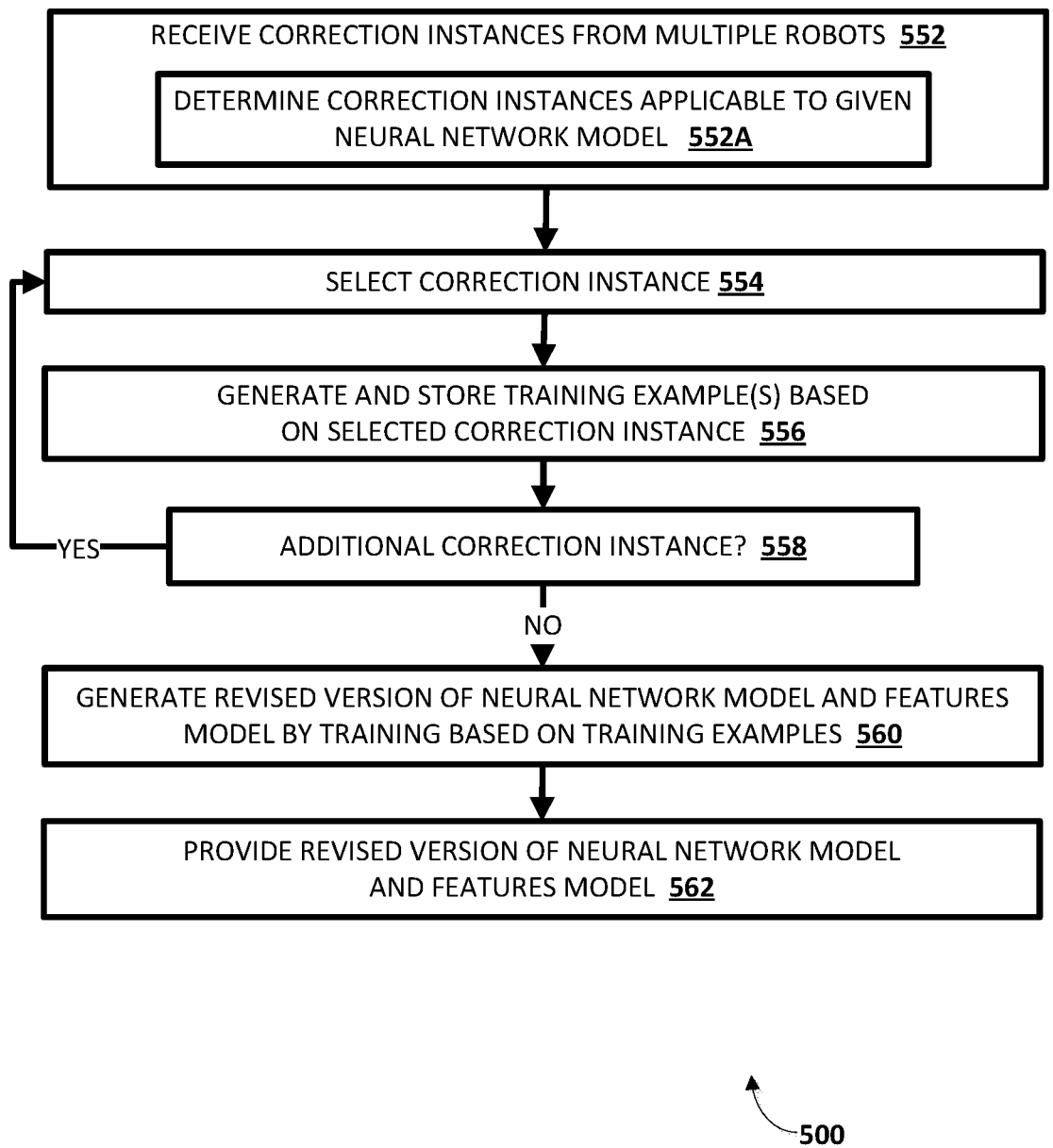
FIG. 5 is a flowchart illustrating another example method according to implementations disclosed herein.

Referring now to FIG. 5, yet another example method 500 according to various implementations is described. For convenience, the operations of the flowchart are described with reference to a system that performs the operations. This system may include various components of a robot and/or of one or more computing devices in communication with the robot. Moreover, while operations of method 500 are shown in a particular order, this is not meant to be limiting. One or more operations may be reordered, omitted or added.

Method 500 of FIG. 5 illustrates an example of generating a revised version of a neural network model and a revised version of a features model based on correction instances, such as correction instances provided at block 364 (FIG. 3) and/or block 464 (FIG. 4).

At block 552, the system receives correction instances from multiple robots. In some implementations, the received correction instances are all applicable to the same given neural network model. For example, the received correction instances may all be applicable to a neural network model utilized in classification of objects.

In some other implementations, the correction instances received at block 552 may collectively be applicable to various neural network models. For example, some correction instances may be applicable to a "classification" neural network model, other correction instances may be applicable to a "grasping" neural network model, etc. In some of those implementations, block 552 includes sub-block 552A, in which the system determines correction instances that are applicable to a given neural network model. In other words, at block 552A, the system may determine, from a group of correction instances applicable to various neural network models, a sub-group that is applicable to the given neural network model. At block 552A, the system can determine the correction instances based on analysis of content of the correction instances. For example, the system can determine such correction instances based on the correction instances explicitly indicating the given neural network model (or a corresponding version). Also, for example, the system can determine such correction instances additionally or alternatively based on correction information included in such correction instances indicating the given model.

At block 554, the system selects a correction instance for the given neural network model.

At block 556, the system generates and stores one or more training examples based on the selected correction instance.

At block 558, the system determines if an additional correction instance is available for the given neural network model. If so, the system proceeds to block 554 and selects an additional correction instance, then proceeds again to block 556 and generates and stores additional training example(s) based on the selected additional correction instance. This may be iteratively performed, and may optionally be performed in parallel with block 560 (described below).

At block 560, the system generates a revised version of the neural network model and a revised version of a corresponding features model by training based on the training examples. For example, the system can start with the same versions of the neural network model and the features model that was utilized by the robots that provided the correction instances of block 552, different versions of the same models, or different (but functionally similar) models. In some implementations, the system generates the revised versions by training until one or more criteria are satisfied. The criteria can include, for example, use of all "current" training examples, at least a threshold quantity of training examples being utilized, at least a threshold duration of training being achieved, etc.

At block 562, the system provides, to one or more robots, the revised version of the given neural network model and the revised version of the features model for use in lieu of the prior versions.

Figure 6:
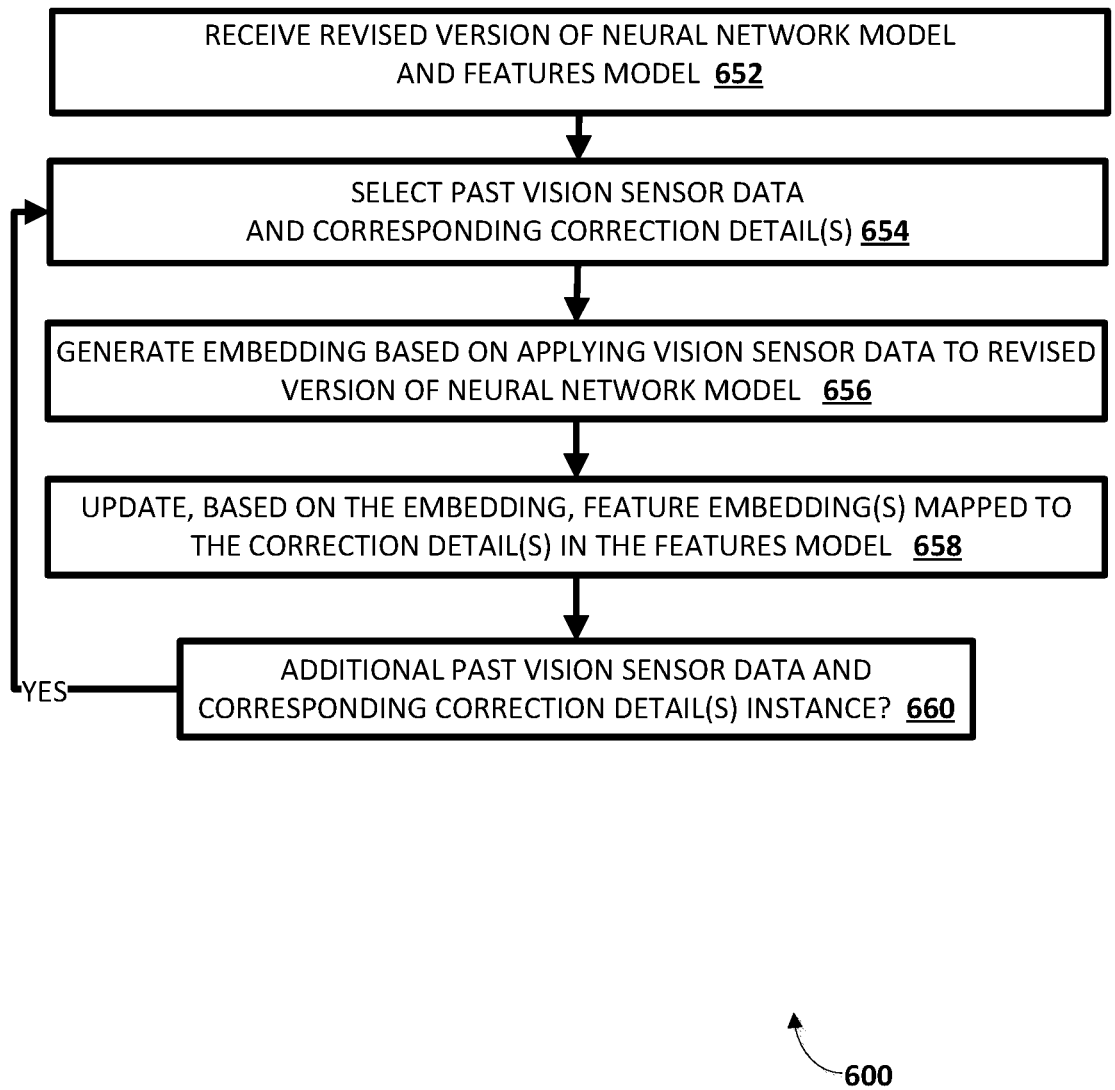
FIG. 6 is a flowchart illustrating another example method according to implementations disclosed herein.

Referring now to FIG. 6, yet another example method 600 according to various implementations is described. For convenience, the operations of the flowchart are described with reference to a system that performs the operations. This system may include various components of a robot and/or of one or more computing devices in communication with the robot. Moreover, while operations of method 600 are shown in a particular order, this is not meant to be limiting. One or more operations may be reordered, omitted or added.

Method 600 of FIG. 6 illustrates an example of adjusting a features model for a received revised version of a neural network model, where the features model is adjusted based on past corrections associated with past version(s) of the neural network model. For example, method 600 illustrates an example of implementations of block 368 of FIG. 3.

At block 652, the system receives a revised version of a neural network model and a features model that corresponds to the revised version of the neural network model.

At block 654, the system selects past vision sensor data and corresponding correction detail(s) for the past vision sensor data. The past vision sensor data and correction detail(s) are previously stored by the system in response to a prior human correction determined based on a prior version of the neural network model. For example, the correction detail(s) may include a correct classification for an object captured by the vision sensor data and may be based on the prior human correction. The prior human correction may have been utilized to update a prior version of the features model. For example, the system may have previously adjusted a feature embedding, of the prior version of the features model, to make it more similar to an embedding generated over the prior version of the neural network model based on the vision sensor data.

At block 656, the system generates an embedding based on applying the vision sensor data to the revised version of the neural network model. It is understood that the embedding generated at block 656 will likely differ from the embedding previously generated over the prior version of the neural network model, due to the revised version of the neural network model being further trained.

At block 658, the system updates, based on the embedding of block 656, the feature embedding(s) mapped to the correction detail(s) in the features model. For example, where the correction detail(s) of block 654 include a correct classification, the classification embedding mapped to that correct classification may be adjusted to be more similar to the embedding of block 656.

At block 660, the system determines whether an additional past vision sensor data and corresponding correction detail(s) instance remains. If so, the system proceeds back to blocks 654, 656, and 658—thereby further updating the features model based on that instance (in view of the revised version of the neural network model). If not, the system may end the method 600 until a further revised version of the neural network model (and corresponding features model) is received, at which point the method 600 may be repeated.

Figure 7:
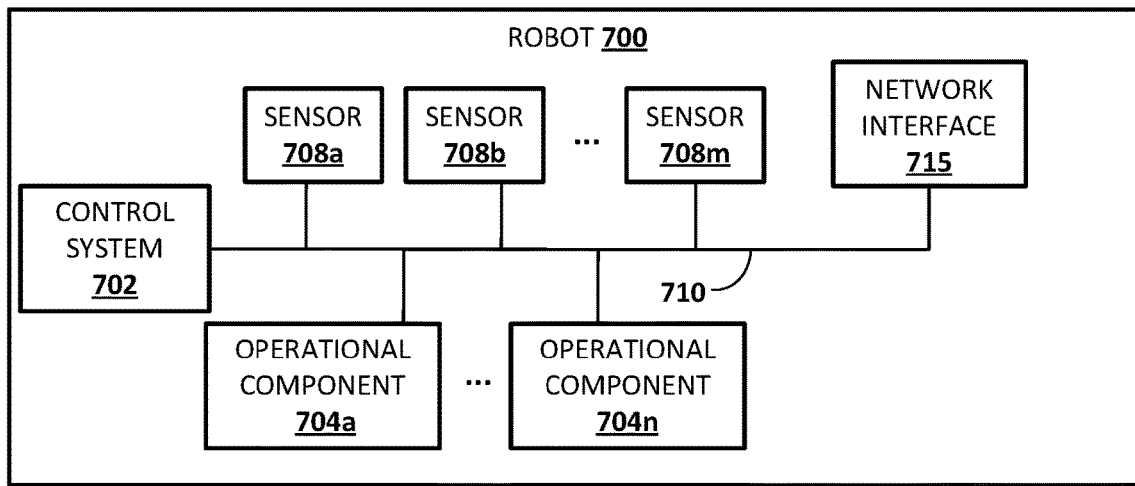
FIG. 7 schematically depicts an example architecture of a robot.

FIG. 7 schematically depicts an example architecture of a robot 700. Robot 190 and/or additional robots 192 of FIG. 1 may implement one or more components of the example architecture of FIG. 7. The robot 700 includes a robot control system 760, one or more operational components 704a-704n, and one or more sensors 708a-708m. The sensors 708a-708m may include, for example, vision sensors (e.g., camera(s), 3D scanners), light sensors, pressure sensors, pressure wave sensors (e.g., microphones), proximity sensors, accelerometers, gyroscopes, thermometers, barometers, and so forth. While sensors 708a-708m are depicted as being integral with robot 700, this is not meant to be limiting. In some implementations, sensors 708a-708m may be located external to robot 700, e.g., as standalone units.

Operational components 704a-704n may include, for example, one or more end effectors (e.g., grasping end effectors) and/or one or more servo motors or other actuators to effectuate movement of one or more components of the robot. For example, the robot 700 may have multiple degrees of freedom and each of the actuators may control actuation of the robot 700 within one or more of the degrees of freedom responsive to the control commands. As used herein, the term actuator encompasses a mechanical or electrical device that creates motion (e.g., a motor), in addition to any driver(s) that may be associated with the actuator and that translate received control commands into one or more signals for driving the actuator. Accordingly, providing a control command to an actuator may comprise providing the control command to a driver that translates the control command into appropriate signals for driving an electrical or mechanical device to create desired motion.

The control system 702 may be implemented in one or more processors, such as a CPU, GPU, and/or other controller(s) of the robot 700. In some implementations, the robot 700 may comprise a "brain box" that may include all or aspects of the control system 702. For example, the brain box may provide real time bursts of data to the operational components 704a-n, with each of the real time bursts comprising a set of one or more control commands that dictate, inter alia, the features of motion (if any) for each of one or more of the operational components 704a-n.

Although control system 702 is illustrated in FIG. 7 as an integral part of the robot 700, in some implementations, all or aspects of the control system 702 may be implemented in a component that is separate from, but in communication with, robot 700. For example, all or aspects of control system 702 may be implemented on one or more computing devices that are in wired and/or wireless communication with the robot 700, such as computing device 810.

In some implementations, the control system 702 functionally implements and/or interfaces with one or more of the components 103 of FIG. 1. For example, the control system 702 may implement the features modules 121A-N, the planning module 122, the commands module 123, the UI input module 124, the UI output module 125, the local update module 126, the correction instance engine 130, and/or the robot data engine 135. Also, for example, the control system 702 may interface with (e.g., via network interface 715) NLP system 133. One or more of the neural network models 150A-N may be stored locally at the robot 700 and accessible to the control system 702.

Figure 8:
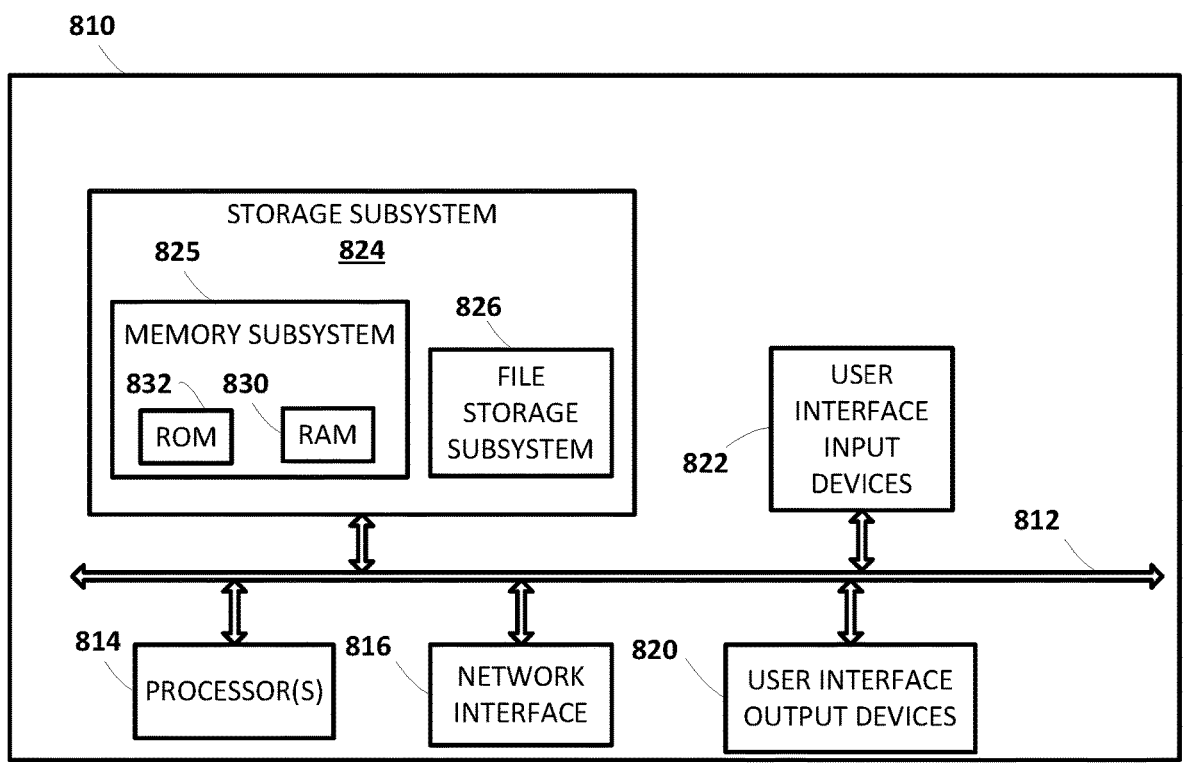
FIG. 8 schematically depicts an example architecture of a computer system.

FIG. 8 is a block diagram of an example computing device 810 that may optionally be utilized to perform one or more aspects of techniques described herein. Computing device 810 typically includes at least one processor 814 which communicates with a number of peripheral devices via bus subsystem 812. These peripheral devices may include a storage subsystem 824, including, for example, a memory subsystem 825 and a file storage subsystem 826, user interface output devices 820, user interface input devices 822, and a network interface subsystem 816. The input and output devices allow user interaction with computing device 810. Network interface subsystem 816 provides an interface to outside networks and is coupled to corresponding interface devices in other computing devices.

User interface input devices 822 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 810 or onto a communication network.

User interface output devices 820 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 810 to the user or to another machine or computing device.

Storage subsystem 824 stores programming and data constructs that provide the functionality of some or all of the modules described herein. For example, the storage subsystem 824 may include the logic to perform selected aspects of the methods described herein.

These software modules are generally executed by processor 814 alone or in combination with other processors. Memory 825 used in the storage subsystem 824 can include a number of memories including a main random access memory (RAM) 830 for storage of instructions and data during program execution and a read only memory (ROM) 832 in which fixed instructions are stored. A file storage subsystem 826 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 826 in the storage subsystem 824, or in other machines accessible by the processor(s) 814.

Bus subsystem 812 provides a mechanism for letting the various components and subsystems of computing device 810 communicate with each other as intended. Although bus subsystem 812 is shown schematically as a single bus, alternative implementations of the bus subsystem may use multiple busses.

Computing device 810 can be of varying types including a workstation, server, computing cluster, blade server, server farm, or any other data processing system or computing device. Due to the ever-changing nature of computers and networks, the description of computing device 810 depicted in FIG. 8 is intended only as a specific example for purposes of illustrating some implementations. Many other configurations of computing device 810 are possible having more or fewer components than the computing device depicted in FIG. 8.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all features, dimensions, materials, and configurations described herein are meant to be exemplary and that the actual features, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented by one or more processors of a robot, comprising:
   determining a classification for an object in an environment of the robot, determining the classification comprising:
      applying, as input to a neural network model locally stored on one or more computer readable media of the robot, sensor data that captures the object and that is generated by at least one sensor of the robot,
      generating, over the neural network model based on the applying, an embedding of the sensor data,
      applying the embedding of the sensor data to a classification model locally stored on one or more of the computer readable media of the robot, and
      determining the classification based on applying the embedding to the classification model;
   receiving user interface input during performance of an action, by the robot, that is directed toward the object and that includes moving one or more components of the robot closer toward the object and/or into contact with the object;
   determining, based on the user interface input and based on the user interface input being received during performance of the action that is directed toward the object, that the user interface input indicates the classification of the object is incorrect;
   in response to determining that the user interface input indicates the classification of the object is incorrect:

updating the locally stored classification model, wherein updating the locally stored classification model occurs without retraining of the neural network model.

2. The method of claim 1, further comprising:
determining, responsive to determining the object has the classification, to perform the action that is directed toward the object;
wherein determining that the user interface input indicates the classification of the object is incorrect comprises:
determining that the user interface input indicates an alternative classification of the object that conflicts with the determined classification.

3. The method of claim 2, wherein updating the locally stored classification model comprises updating the locally stored classification model based on the alternative classification.

4. The method of claim 3, wherein updating the locally stored classification model based on the alternative classification comprises:
identifying a current alternative classification embedding that is mapped to the alternative classification in the locally stored classification model; and
determining an adjusted alternative classification embedding based on the alternative classification embedding and based on the embedding of the sensor data.

5. The method of claim 4, wherein determining the adjusted alternative classification embedding based on the alternative classification embedding and based on the embedding of the sensor data comprises:
determining the adjusted alternative classification embedding based on an average of the alternative classification embedding and the embedding of the sensor data.

6. The method of claim 4, further comprising:
storing the sensor data and the alternative classification;
subsequent to updating the locally stored classification model, and subsequent to storing the sensor data and the alternative classification:
receiving a new version of the neural network model and a new version of the classification model;
applying the sensor data as input to the new version of the neural network model;
generating, over the new version of the neural network model based on the applying, a new embedding of the sensor data;
identifying, in the new version of the classification model, a new alternative classification embedding of the alternative classification;
adjusting, in the new version of the classification model, the new alternative classification embedding of the alternative classification based on the new embedding of the sensor data.

7. The method of claim 3, wherein updating the locally stored classification model based on the alternative classification comprises:
determining that the locally stored classification model lacks any alternative classification embedding for the alternative classification; and
in response, storing an alternative classification embedding in the locally stored classification model, the alternative classification embedding being based on the embedding of the sensor data.

8. The method of claim 3, wherein updating the locally stored classification model further comprises:
applying, as input to the neural network model, additional sensor data that captures the object and that is generated by the sensor of the robot during performance of the action directed toward the object;
generating, over the neural network model based on the applying, a further embedding of the additional sensor data;
and updating the locally stored classification model based on the further embedding and the alternative classification.

9. The method of claim 1, wherein determining the classification based on applying the embedding to the classification model comprises:
determining the classification based on determining that the embedding is more similar to a classification embedding mapped to the classification than it is to alternative classification embeddings mapped to alternative classifications.

10. The method of claim 9, wherein updating the locally stored classification model comprises:
determining an adjusted classification embedding for the classification based on modifying the classification embedding to be less similar to the embedding.

11. A method implemented by one or more processors of a robot, comprising:
applying, as input to a neural network model locally stored on one or more computer readable media of the robot, sensor data that captures an object and that is generated by at least one sensor of the robot;
generating, over the neural network model based on the applying, an embedding of the sensor data;
determining a feature of the sensor data based on applying the embedding to a features model locally stored on one or more of the computer readable media of the robot, the features model mapping the feature to a feature embedding of the feature and mapping additional features to corresponding additional feature embeddings, wherein determining the feature comprises:
determining the feature based on similarity of the embedding of the sensor data to the feature embedding mapped to the feature;
performing, based on the determined feature, a robotic action that is directed toward the object, wherein performing the robotic action comprises providing control commands to actuators of the robot;
receiving user interface input in response to performance of the robotic action that is directed toward the object and that is performed based on the determined feature;
determining that the user interface input indicates a particular additional feature of the additional features;
in response to determining that the user interface input indicates the particular additional feature and in response to the user interface input being received in response to the performance of the robotic action:
adjusting, in the features model, the additional feature embedding of the particular additional feature based on the embedding of the sensor data.

12. The method of claim 11, wherein the feature is a first classification and the particular additional feature is a second classification.

13. The method of claim 11, wherein the feature is a first bounding area and the additional feature is a second bounding area.

14. The method of claim 13, wherein the first bounding area is defined by a plurality of first pixels and the second bounding area is defined by a plurality of second pixels.

15. The method of claim 13, wherein the user interface input is generated at a client computing device based on a user indicating the second bounding area via the client computing device, the second bounding area indicated via the client device during display of an image that is based on the sensor data.

16. The method of claim 15, further comprising providing the image to the client device in response to initial user interface input that indicates the robotic action is incorrect.

17. A method implemented by one or more processors of a robot, comprising:
 applying, as input to a neural network model locally stored on one or more computer readable media of the robot, sensor data that captures the object and that is generated by at least one sensor of the robot;
 generating, over the neural network model based on the applying, an embedding of the sensor data;
 determining a feature of the sensor data based on applying the embedding to a features model locally stored on one or more of the computer readable media of the robot, the features model mapping the feature to a feature embedding of the feature and mapping additional features to corresponding additional feature embeddings, wherein determining the feature comprises:
  determining the feature based on the feature embedding mapped to the feature being more similar to the embedding of the sensor data than it is to any of the additional feature embeddings;
 performing a robotic action based on the determined feature, wherein performing the robotic action comprises providing control commands to actuators of the robot;
 receiving, at the robot, user interface input in response to performance of the robotic action, the user interface input being spoken input;
 determining that the user interface input indicates the robotic action is incorrect;
 in response to determining that the user interface input indicates the robotic action is incorrect:
  updating the locally stored features model based on the embedding of the sensor data,
  generating a correction instance that includes the sensor data, and
  transmitting the correction instance to one or more remote computing devices via a network interface, wherein the one or more remote computing devices use the correction instance to generate at least one training example for generating a revised version of the neural network model.

18. The method of claim 17, further comprising:
 receiving, via the network interface, the revised version of the neural network model after the neural network model is trained based on:
  the training example, and
  additional training examples from additional correction instances from additional robots.

19. The method of claim 17, wherein determining that the user interface input indicates the determined feature is incorrect comprises:
 determining that the user interface input indicates an additional feature, of the additional features, that conflicts with the determined feature.

20. The method of claim 19, wherein updating the locally stored features model based on the embedding of the sensor data comprises:
 adjusting an additional feature embedding based on the embedding of the sensor data, the additional feature embedding being one of the additional feature embeddings and being mapped to the additional feature in the locally stored features model.

21. The method of claim 20, wherein the correction instance includes an indication of the additional feature.

22. The method of claim 18, wherein updating the locally stored features model based on the embedding of the vision sensor data comprises:
 determining that the additional feature is not mapped to any of the additional feature embeddings in the locally stored features model; and
 in response, storing a particular feature embedding for the additional feature in the locally stored features model, the particular feature embedding being based on the embedding of the vision sensor data.

23. The method of claim 1, further comprising:
 providing, via one or more speakers of the robot and during performance of the action directed toward the object, user interface output that provides a perceptible indication of the classification.

* * * * *